(12) United States Patent
Frank et al.

(10) Patent No.: US 8,760,465 B2
(45) Date of Patent: Jun. 24, 2014

(54) METHOD AND APPARATUS TO INCREASE BIT-DEPTH ON GRAY-SCALE AND MULTI-CHANNEL IMAGES (INVERSE DITHERING)

(75) Inventors: Michael Frank, Sunnyvale, CA (US); Ulrich T. Barnhoefer, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 267 days.

(21) Appl. No.: 13/085,186

(22) Filed: Apr. 12, 2011

(65) Prior Publication Data

US 2012/0262475 A1    Oct. 18, 2012

(51) Int. Cl.
*G09G 5/02*    (2006.01)

(52) U.S. Cl.
USPC ............ 345/597; 345/596; 345/589; 345/605

(58) Field of Classification Search
USPC ........ 345/596–599, 611, 616; 358/3.03–3.05, 358/3.06, 3.08, 3.13, 3.26, 3.27, 534–536, 358/465–466; 382/251, 252, 270, 272, 274, 382/275
See application file for complete search history.

(56) References Cited

U.S. PATENT DOCUMENTS

| | | | |
|---|---|---|---|
| 5,506,699 A * | 4/1996 | Wong | 358/3.08 |
| 6,185,334 B1 * | 2/2001 | Cheung et al. | 382/199 |
| 6,347,160 B1 * | 2/2002 | Cheung et al. | 382/260 |
| 6,795,085 B1 | 9/2004 | Doherty et al. | |
| 7,081,901 B1 | 7/2006 | Ludden et al. | |
| 7,542,620 B1 | 6/2009 | Bilbrey et al. | |
| 8,009,327 B2 * | 8/2011 | Ishikawa | 358/3.03 |
| 2004/0010633 A1 * | 1/2004 | Ishikawa | 710/1 |
| 2004/0066363 A1 * | 4/2004 | Yamano et al. | 345/98 |
| 2005/0265459 A1 | 12/2005 | Bhattacharjya et al. | |
| 2008/0063297 A1 * | 3/2008 | Chen et al. | 382/275 |
| 2010/0207951 A1 | 8/2010 | Qi et al. | |

* cited by examiner

*Primary Examiner* — James A Thompson
*Assistant Examiner* — Nicole Gillespie
(74) *Attorney, Agent, or Firm* — Fletcher Yoder PC

(57) ABSTRACT

The present disclosure relates to the use of inverse dithering of color or grey-scale images. In certain embodiments, an image area may be selected having a center pixel. A predictive value of the image area may be found by averaging the values of the pixels in the image area. This predictive value may be compared to the center pixel's real value. A difference between the real value and the predictive value may then be found and used to diffuse the energy removed from the center pixel to neighboring pixels. By inverse dithering images using an energy diffusion approach, the images may be presented as having a more visually appealing display, even in situations where the images may undergo further edge enhancements.

25 Claims, 14 Drawing Sheets

10204000 PIXELS, 168712 COLORS

10204000 PIXELS, 20051 COLORS

METHOD AND APPARATUS TO INCREASE BIT-DEPTH ON GRAY-SCALE AND MULTI-CHANNEL IMAGES (INVERSE DITHERING)

BACKGROUND

The present disclosure relates generally to image processing and, more specifically, to techniques for inverse dithering images using an energy diffusion approach.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In recent years, electronic display devices have become increasingly popular due, at least in part, to such devices becoming more and more affordable for the average consumer. In addition to a number of electronic display devices currently available for desktop monitors and notebook computers, it is not uncommon for digital display devices to be integrated as part of another electronic device, such as a cellular phone, a tablet computing device, or a media player. Further, it is not uncommon for digital devices to be connected to a second electronic display device, such as a television or projector, suitable for providing a larger display area.

Certain devices, such as portable devices, may use lower bit displays (e.g., 6-bit displays) to present visual information, and dithering techniques may be used to create the appearance of higher-bit depth (e.g., 8-bit) to the human eye. Additionally, electronic displays are typically configured to output a set number of colors within a color range. In certain cases, a graphical image to be displayed may have a number of colors greater than the number of colors that are capable of being shown by the electronic display. For example, a graphical image may be encoded with a 24-bit color depth (e.g., 8 bits for each of red, green, and blue components of the image), while an electronic display may be configured to provide output images at an 18-bit color depth (e.g., 6 bits for each of red, green, and blue components of the image).

Rather than simply discarding least-significant bits, dithering techniques may be used to output a graphical image that appears to be a closer approximation of the original color image. That is, when the dithered image is displayed on the electronic device (e.g., cell phone, laptop, workstation), the dithered image looks substantially the same to the human eye as the original source image. However, although the dithered image is visually pleasing to the human eye on certain displays, other displays may apply image processing techniques, such as edge enhancement techniques which may find "false" edges in the dithered image due to quantization steps performed during dithering. These "false" edges may be amplified during the edge enhancement, resulting in visual artifacts such as halos and/or rings.

SUMMARY

A summary of certain embodiments disclosed herein is set forth below. These aspects are presented merely to provide the reader with a brief summary of these certain embodiments and that these aspects are not intended to limit the scope of this disclosure. Indeed, this disclosure may encompass a variety of aspects that may not be set forth below.

The present disclosure generally relates to inverse dithering techniques that may be used to improve the visual quality of dithered color or grey-scale (i.e., grey-level) images on an electronic display. In certain embodiments, an image processing circuitry may connect an electronic device, such as a media player, a cell phone, a laptop, a workstation, a tablet, and so forth, to the electronic display. The image processing circuitry may be provided internally or externally to the electronic device, and the circuitry may be used to transmit image data to internal and external electronic displays, such as built-in screens, external monitors, and televisions.

The image processing circuitry may use inverse dithering techniques, including spatial and/or temporal inverse dithering techniques disclosed herein, to process the dithered image data received from the electronic device. Inverse dithering may enable a higher quality visualization of the image data, and may also allow for reduced transmission bandwidth of image data. In certain embodiments, the image processing circuitry use an inverse dithering energy diffusion technique to derive an energy from a pixel and diffuse the energy to neighboring pixels. More specifically, a prediction pixel value P of a dithered image area may be computed based on an average of the neighboring pixel values. The prediction pixel value P may then be compared to a real value of R the pixel, such as the color value c of the pixel. The difference between P and R may be used to create a diffusion value D. The diffusion value D may be limited to a certain range $\{-Q \ldots +Q\}$ based in part on quantization steps used during the initial dithering process so as to preserve true edges in the image. The range-limited diffusion value D may be subtracted from the pixel P. Energy removed from the pixel is then added back to the image. In one embodiment, an equal distribution is used to distribute the removed energy. In other embodiments, a weighted distribution, a random distribution, a weighted-by-filter-kernel distribution, or a weighted-by-directional-filter distribution may be used to distribute the energy. By diffusing some of the energy in the pixel to neighboring pixels, image enhancement algorithms such as edge detection and enhancement may display an inverse dithered image that is more visually pleasing to the human eye and that closely matches the original, undithered image. Additionally, a dithered image having less bits than an original source image may be transmitted and reconstructed through inverse dithering, thus reducing transmission bandwidth.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION OF SPECIFIC EMBODIMENTS

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As will be discussed below, the present disclosure relates generally to techniques for processing and displaying image data on an electronic display device. In particular, certain aspects of the present disclosure may relate to techniques for processing images using spatial and/or temporal inverse dithering techniques. Further, it should be understood that the presently disclosed techniques may be applied to both still images and moving images (e.g., video), and may be utilized in any suitable type of electronic display, such as a television, a projector, a monitor, and the like.

Figure 1:
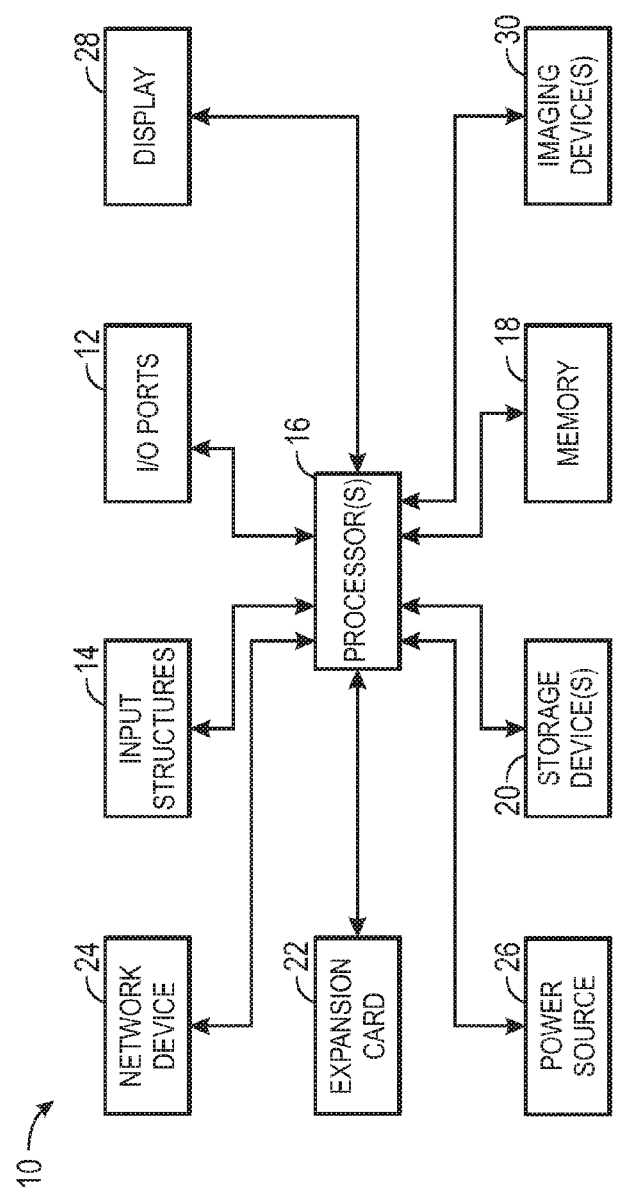
FIG. 1 is a simplified block diagram depicting components of an embodiment of an electronic device that includes image processing circuitry configured to implement one or more of the image processing techniques set forth in the present disclosure.

With the foregoing in mind, it may be beneficial to first discuss embodiments of certain display systems that may incorporate the inverse dithering techniques as described herein. Turning now to the figures, FIG. 1 is a block diagram illustrating an example of an electronic device 10 that may provide for the processing of image data using one or more of the image processing techniques mentioned above. The electronic device 10 may be any type of electronic device, such as a laptop or desktop computer, a mobile phone, a digital media player, a media distribution system, or the like, that is configured to process and display image data. By way of example only, the electronic device 10 may be a portable electronic device, such as a model of an iPad®, iPod® or iPhone®, available from Apple Inc. of Cupertino, Calif. Additionally, the electronic device 10 may be a desktop or laptop computer, such as a model of a MacBook®, MacBook® Pro, MacBook Air®, iMac®, Mac® Mini, or Mac Pro®, available from Apple Inc. Further, the electronic device 10 may be a media distribution device such as a model of an Apple TV®, available from Apple Inc.

Regardless of its form (e.g., portable or non-portable), it should be understood that the electronic device 10 may provide for the processing of image data using one or more of the image processing techniques briefly discussed above, which may include spatial and/or temporal inverse dithering techniques, among others. In some embodiments, the electronic device 10 may apply such image processing techniques to image data stored in a memory of the electronic device 10. In other embodiments, the electronic device 10 may forward image data to an external circuitry for further image processing, as described in more detail with respect to FIGS. 4 and 5. Embodiments showing both portable and non-portable embodiments of the electronic device 10 will be further discussed below with respect to FIGS. 2 and 3.

As shown in FIG. 1, the electronic device 10 may include various internal and/or external components which contribute to the function of the device 10. The various functional blocks shown in FIG. 1 may include hardware elements (including circuitry), software elements (including computer code stored on a computer-readable medium) or a combination of both hardware and software elements. For example, in the presently illustrated embodiment, the electronic device 10 may include input/output (I/O) ports 12, input structures 14, one or more processors 16, memory device 18, non-volatile storage 20, expansion card(s) 22, networking device 24, power source 26, and display 28. Additionally, the electronic device 10 may include one or more imaging devices 30, such as a digital camera. As will be discussed further below, the processor(s) 16 may be configured to implement one or more of the above-discussed image processing techniques. As can be appreciated, image data processed by the processor(s) 16 may be retrieved from the memory 18 and/or the non-volatile storage device(s) 20, or may be acquired using the imaging device 30.

It should be understood that the system block diagram of the device 10 shown in FIG. 1 is intended to be a high-level control diagram depicting various components that may be included in such a device 10. Indeed, as discussed below, the depicted processor(s) 16 may, in some embodiments, include multiple processors, such as a main processor (e.g., CPU), and dedicated image and/or video processors. In such embodiments, the processing of image data may be primarily handled by these dedicated processors, thus effectively offloading such tasks from a main processor (CPU).

The input structures 14 may provide user input or feedback to the processor(s) 16. For instance, input structures 14 may be configured to control one or more functions of electronic device 10, such as applications running on electronic device 10. In addition to processing various input signals received via the input structure(s) 14, the processor(s) 16 may control the general operation of the device 10. For instance, the processor(s) 16 may provide the processing capability to execute an operating system, programs, user and application interfaces, and any other functions of the electronic device 10.

The processor(s) 16 may include one or more microprocessors, such as one or more "general-purpose" microprocessors, one or more special-purpose microprocessors and/or application-specific microprocessors (ASICs), or a combination of such processing components. For example, the processor(s) 16 may include one or more reduced instruction set (e.g., RISC) processors, as well as video processors, audio processors and/or related chip sets. Additionally, the processors (16) may include a graphics processor (GPU), as described in more detail below with respect to FIG. 4. As will be appreciated, the processor(s) 16 may be coupled to one or more data buses for transferring data and instructions between various components of the device 10. In certain embodiments, the processor(s) 16 may provide the processing capability to execute source code embodiments capable of employing the dithering techniques described herein.

The instructions or data to be processed by the processor(s) 16 may be stored in a computer-readable medium, such as a memory device 18. The memory device 18 may be provided as a volatile memory, such as random access memory (RAM) or as a non-volatile memory, such as read-only memory (ROM), or as a combination of one or more RAM and ROM devices. In addition, the memory 18 may be used for buffering or caching during operation of the electronic device 10. For instance, in one embodiment, the memory 18 includes one or more frame buffers for buffering video data as it is being output to the display 28.

In addition to the memory device 18, the electronic device 10 may further include a non-volatile storage 20 for persistent storage of data and/or instructions. The non-volatile storage 20 may include flash memory, a hard drive, or any other optical, magnetic, and/or solid-state storage media, or some combination thereof. In accordance with aspects of the present disclosure, image processing data stored in the non-volatile storage 20 and/or the memory device 18 may be processed by the image processing circuitry 32 prior to being output on a display.

The embodiment illustrated in FIG. 1 may also include one or more card or expansion slots. The card slots may be configured to receive an expansion card 22 that may be used to add functionality, such as additional memory, I/O functionality, networking capability, or graphics processing capability to the electronic device 10. The electronic device 10 also includes the network device 24, which may be a network controller or a network interface card (NIC) that may provide for network connectivity over a wireless 802.11 standard or any other suitable networking standard, such as a local area network (LAN), a wide area network (WAN).

The power source 26 of the device 10 may include the capability to power the device 10 in both non-portable and portable settings. The display 28 may be an internal or external display used to present various images generated by device 10, such as a GUI for an operating system, or image data (including still images and video data). As mentioned above, the image data may include image data acquired using the imaging device 30 or image data retrieved from the memory 18 and/or non-volatile storage 20. The display 28 may be any suitable type of display, such as a liquid crystal display (LCD), plasma display, or an organic light emitting diode (OLED) display, for example. Additionally, as discussed above, the display 28 may be an internal or an external display. For example, the display 28 may be provided as an internal LCD screen included in the electronic device 10, or as an external monitor attached to the electronic device 10.

Figure 2:
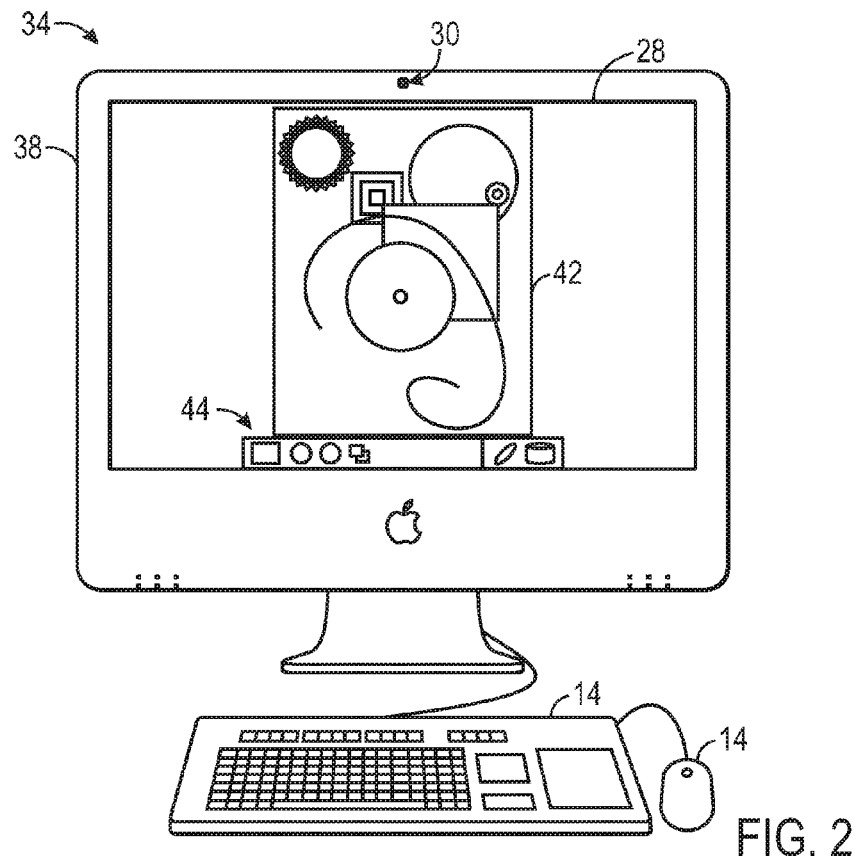
FIG. 2 is a front view of the electronic device of FIG. 1 in the form of a desktop computing device, in accordance with aspects of the present disclosure.
Figure 3:
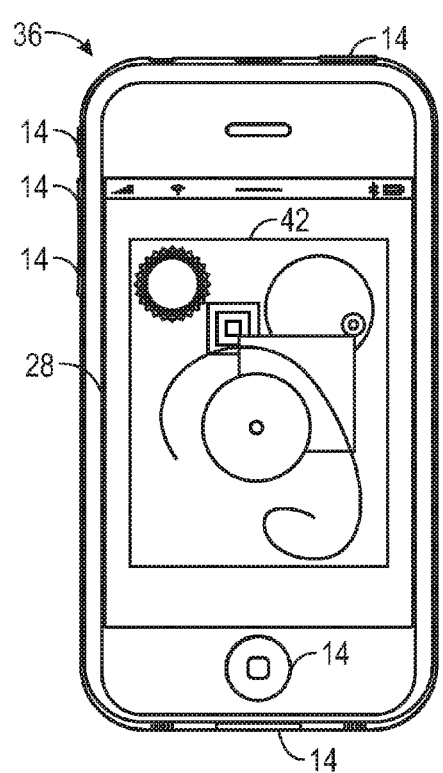
FIG. 3 is a front view of the electronic device of FIG. 1 in the form of a handheld portable electronic device, in accordance with aspects of the present disclosure.

Referring again to the electronic device 10, FIGS. 2 and 3 illustrate various forms that the electronic device 10 may take. As mentioned above, the electronic device 10 may take the form of a computer, including computers that are generally portable (such as laptop, notebook, and tablet computers) as well as computers that are generally non-portable (such as desktop computers, workstations and/or servers), or other type of electronic device, such as handheld portable electronic devices (e.g., a digital media player or mobile phone). In particular, FIGS. 2 and 3 depict the electronic device 10 in the form of a desktop computer 34 and a handheld portable electronic device 36, respectively.

FIG. 2 further illustrates an embodiment in which the electronic device 10 is provided as the desktop computer 34. As shown, the desktop computer 34 may be housed in an enclosure 38 that includes a display 28, as well as various other components discussed above with regard to the block diagram shown in FIG. 1. Further, the desktop computer 34 may include an external keyboard and mouse (input structures 14) that may be coupled to the computer 34 via one or more I/O ports 12 (e.g., USB) or may communicate with the computer 34 wirelessly (e.g., RF, Bluetooth, etc.). The desktop computer 34 also includes an imaging device 30, which may be an integrated or external camera, as discussed above. In certain embodiments, the depicted desktop computer 34 may be a model of an iMac®, Mac® mini, or Mac Pro®, available from Apple Inc.

As further shown, the display 28 may be configured to generate various images that may be viewed by a user, such as a displayed image 42. The displayed image 42 may have been generated by using, for example, the inverse dithering techniques described in more detail below. During operation of the computer 34, the display 28 may display a graphical user interface ("GUI") 44 that allows the user to interact with an operating system and/or application running on the computer 34.

Turning to FIG. 3, the electronic device 10 is further illustrated in the form of portable handheld electronic device 36, which may be a model of an iPod® or iPhone® available from Apple Inc. The handheld device 36 includes various user input structures 14 through which a user may interface with the handheld device 36. For instance, each input structure 14 may be configured to control one or more respective device functions when pressed or actuated. By way of example, one or more of the input structures 14 may be configured to invoke a "home" screen or menu to be displayed, to toggle between a sleep, wake, or powered on/off mode, to silence a ringer for a cellular phone application, to increase or decrease a volume output, and so forth. It should be understood that the illustrated input structures 14 are merely exemplary, and that the handheld device 36 may include any number of suitable user input structures existing in various forms including buttons, switches, keys, knobs, scroll wheels, and so forth. In the depicted embodiment, the handheld device 36 includes the display device 28. The display device 28, which may be an LCD, OLED, or any suitable type of display, may display various images generated by the techniques disclosed herein. For example, the display 28 may display the image 42.

Figure 4:
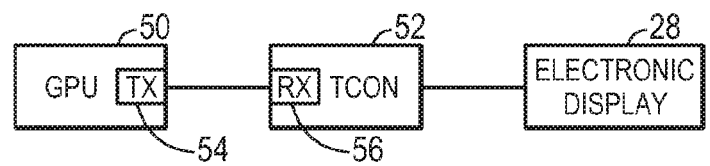
FIG. 4 is a simplified block diagram depicting components of an example of graphics processor connect to a timing controller, in accordance with aspects of the present disclosure.

FIG. 4 is a block diagram illustrating an example of a graphics processor (GPU) 50 that may be communicatively connected to the electronic display 28 through a timing controller (TCON) 14. In one example, the GPU 50, TCON 52, and display 28 are all incorporated inside the electronic device 10 and used for displaying color or grayscale images. In this example, the GPU 50 may first dither an image, and then transmit the dithered image to the TCON 52 through a transmission circuitry 54. The image may be dithered by the GPU 50 to reduce transmission bandwidth. That is, the dithered image may have less bits than the original undithered image, thus reducing the number of bits used during transmission. Accordingly, very high transmission rates may be used. Indeed, the transmission may include parallel data streams in which multiple streams of image data may be transmitted through the transmission circuitry 54 at over 2.5 gigabits per second per stream.

The transmission circuitry 54 may include embedded DisplayPort (eDP) circuitry and/or low voltage differential signal (LVDS) circuitry suitable for high speed transmission of data. The TCON 52 may then receive the data through a reception circuitry 56. The reception circuitry 56 may also include eDP and/or LVDS circuitry suitable for receiving the high speed data, including parallel data streams. The TCON 52 may then inverse dither the received image data, thus creating an inverse dithered image that is more visually pleasing to the human eye. The resulting inverse dithered image may then be displayed by the electronic display 28. By dithering the image, transmitting the dithered image, and subsequently inverse dithering the dithered image, high pixel depth images and video may be presented having lower bandwidth transmission requirements.

In another example, the GPU 50 may be included in the electronic device 10, while the TCON 52 is provided as a component of the external electronic display 28 (e.g., television or monitor). In this embodiment, the GPU 50 may first dither the source image, as mentioned above, to reduce transmission bandwidth. The dithered image may then be transmitted to the TCON 52 included in the electronic display 28 through a cable, such as a high definition multimedia interface (HDMI) cable, a DisplayPort (DP) cable, a LVDS cable, a eDP cable, and the like. By transmitting the dithered image instead of the original source image, the transmission bandwidth may be substantially reduced, allowing for high speed transmission of still and video images. The dithered images may then be inverse dithered by the TCON 52 of the electronic display 28, and presented to a viewer. Inverse dithering the dithered images may result in a display image having substantially the same visual quality as the original source image when viewed by the human eye.

Figure 5:
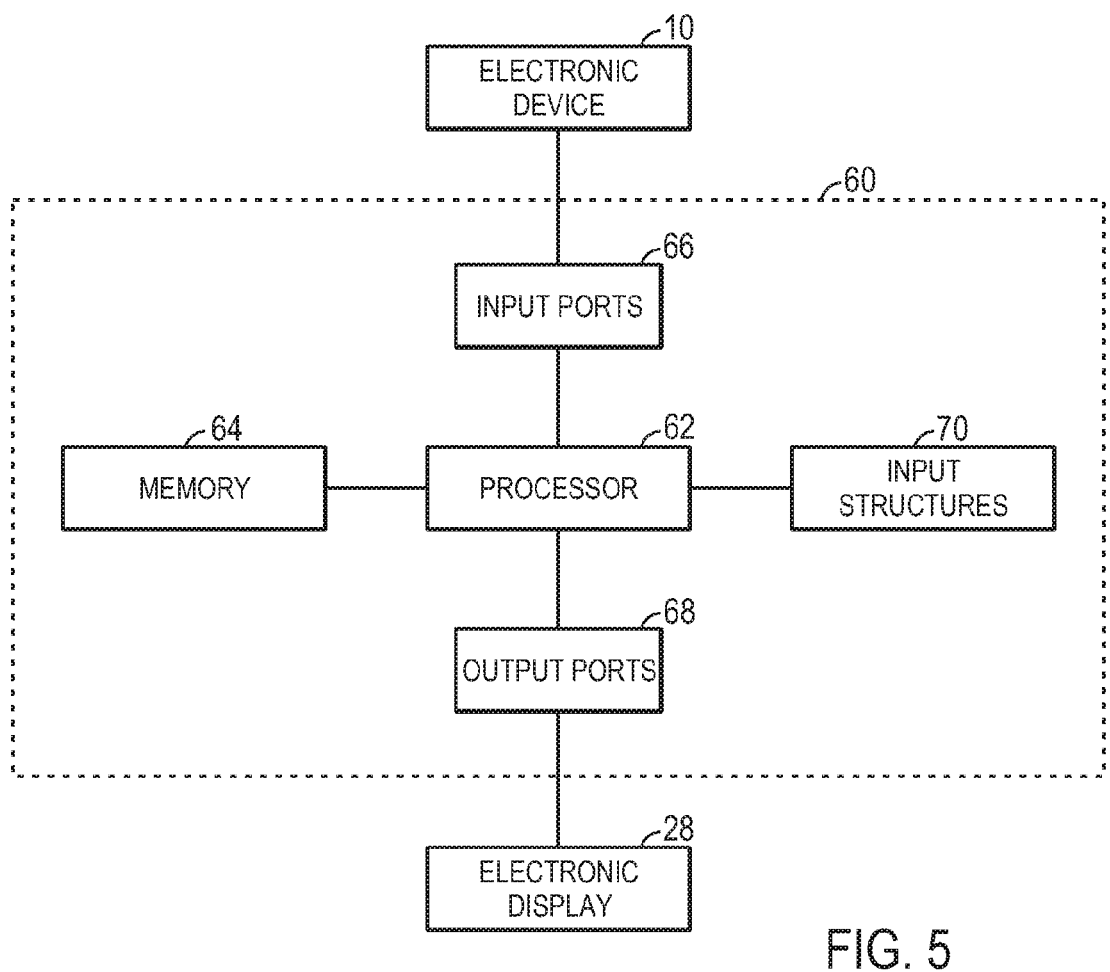
FIG. 5 is a simplified block diagram depicting components of embodiments of an electronic device, a display device, and intervening image processing circuitry configured to implement one or more of the image processing techniques set forth in the present disclosure.

FIG. 5 is a block diagram illustrating an example of an electronic device 10 that may be communicatively connected to an external display 28 through an external image processing circuitry 60 suitable for converting images, such as dithered images sent by the electronic display, into inverse dithered images for display by the external display 28. Indeed, additionally or alternatively to the image processing performed by the processor(s) 16 shown in FIG. 1 and the TCON 52 shown in FIG. 4, the external image processing circuitry 60 may also incorporate the inverse dithering techniques described herein. In certain embodiments, the image processing circuitry 60 may be included in a cable, a dongle, a housing, or other external form suitable for connecting the electronic device 10 to an external display 28. As mentioned above, the electronic device 10 may be any type of electronic device, such as a laptop or desktop computer, a mobile phone, a digital media player, a media distribution device, or the like, that is configured to process and display image data. Regardless of its form (e.g., portable or non-portable), it should be understood that the electronic device 10 may provide for the processing and/or distribution of image data, which may include dithered image data, among others, to the display 28. For example, the electronic device 10 may process a graphical image encoded with a 24-bit color depth (e.g., 8 bits for each of red, green, and blue components of the image) and use a dithering technique, such as a Floyd-Steinberg dithering algorithm, to transform the image to an 18-bit color depth image (e.g., 6 bits for each of red, green, and blue components of the image). By using the dithering technique, the lower pixel depth image appears to be a close approximation of the original color image, but uses fewer pixels for storage and transmittal. In certain cases, the electronic display 28 may lack circuitry such as a TCON 52 suitable for inverse dithering image data and instead include circuitry suitable for enhancing image edges. In these displays 28, if the lower pixel depth image were to be transmitted directly to the electronic display 28, the electronic display 28 may further process the lower pixel depth image by using, for example, an edge detection and enhancement algorithm. Such an algorithm is suitable for improving the perceived sharpness of certain images. However, many dithered images processed by the edge detection and enhancement algorithm may result in a displayed image having unsightly artifacts such as halos and rings. Such artifacts may result when quantization operations performed during the dithering process are magnified through edge enhancement techniques.

The artifacts in the display image may be reduced or eliminated by using the external circuitry 60 to inverse dither the transmitted image. In one embodiment, the dithered image is transmitted from the electronic device 10 to the image processing circuitry 60. The image processing circuitry 60 includes processor(s) 62 suitable for further processing the dithered image into an inverse dithered image before retransmittal to the electronic display 28. The electronic display 28 may then apply image processing techniques, such as edge enhancement algorithms, to the inverse dithered image. Because the quantization of the lower-bit depth image data has been improved in the inverse dithering, the display image may have an improved visual presentation lacking unsightly artifacts such as halos or rings.

As will be discussed further below, the processor(s) 62 may be configured to implement one or more of the above-discussed inverse dithering techniques so as to reduce or eliminate unsightly artifacts shown by the electronic display 28. As can be appreciated, image data processed by the processor(s) 62 may be retrieved from a memory 64 (e.g., frame buffer memory) and/or the electronic device 10. It should be understood that the system block diagram shown in FIG. 5 is intended to be a high-level diagram depicting various components that may be included, for example, in such an image processing circuitry 60. Indeed, as discussed below, the depicted processor(s) 62 may, in some embodiments, include multiple processors, such as dedicated image and/or video processors. In such embodiments, the processing of image data may be handled by these dedicated processors, thus effectively providing for the real-time processing of still images and/or video image data.

The processor(s) 62 may include one or more microprocessors, such as one or more "general-purpose" microprocessors, one or more special-purpose microprocessors and/or application-specific microprocessors (ASICs), or a combination of such processing components. For example, the processor(s) 62 may include one or more reduced instruction set (e.g., RISC) processors, as well as graphics processors (GPU), video processors, audio processors and/or related chip sets. As will be appreciated, the processor(s) 62 may be coupled to one or more input ports 66 and output ports 68 for transferring data between the electronic device 10 and the electronic display 28.

The instructions or data to be processed by the processor(s) 62 may be stored in a computer-readable medium, such as the memory device 64. The memory device 64 may be provided as a volatile memory, such as random access memory (RAM) or as a non-volatile memory, such as read-only memory (ROM), or as a combination of one or more RAM and ROM devices. In addition, the memory 64 may be used for buffering or caching during operation of the electronic device 10. For instance, in one embodiment, the memory 64 includes one or more frame buffers for buffering video data as it is being output to the electronic display 28.

The input ports 66 may be used to connect the image processing circuitry 60 to the electronic device 10. For example, the input ports 66 may include a high definition multimedia interface (HDMI) port, a digital visual interface (DVI) port, a DisplayPort, a Mini DisplayPort, a video graphics array (VGA) port, an iPad® dock connector, an iPod® dock connector, and/or an iPhone® dock connector. Image data may be transmitted through the input ports 66, processed by the processor(s) 62, and re-transmitted to the electronic display 28 through the output ports 68. The output ports 68 may be any port suitable for communicating with the electronic display 28. For example, the output ports 68 may include an S-video port, an HDMI port, a composite video port, a component video port, a VGA port, a DVI port, a DisplayPort, a Mini DisplayPort, and the like.

Input structures 70 may provide user input or feedback to the processor(s) 62. For instance, input structures 70 may be configured to control one or more functions of the image processing circuitry 60, such as turning on or off the image processing of images received from the electronic device 10. In addition to processing various input signals received via the input structures 70, the processor(s) 62 may control the general operation of the image processing circuitry 60. For instance, the processor(s) 62 may provide the processing capability to execute an operating system (e.g., embedded operating system), programs, and any other functions of the image processing circuitry 60.

The electronic display 28 may be used to display various images generated by the electronic device 10, including still images and video data processed by the processor(s) 62, as will be discussed further below. As mentioned above, the electronic display 28 may be any suitable type of display, such as a liquid crystal display (LCD) television, a plasma display, a digital light processing (DLP) projector, an organic light emitting diode (OLED) monitor, or a cathode ray tube (CRT) display, for example. Additionally, as discussed above, the display 28 may provide for certain image processing algorithms, such as edge detection and enhancement algorithms.

Figure 6:
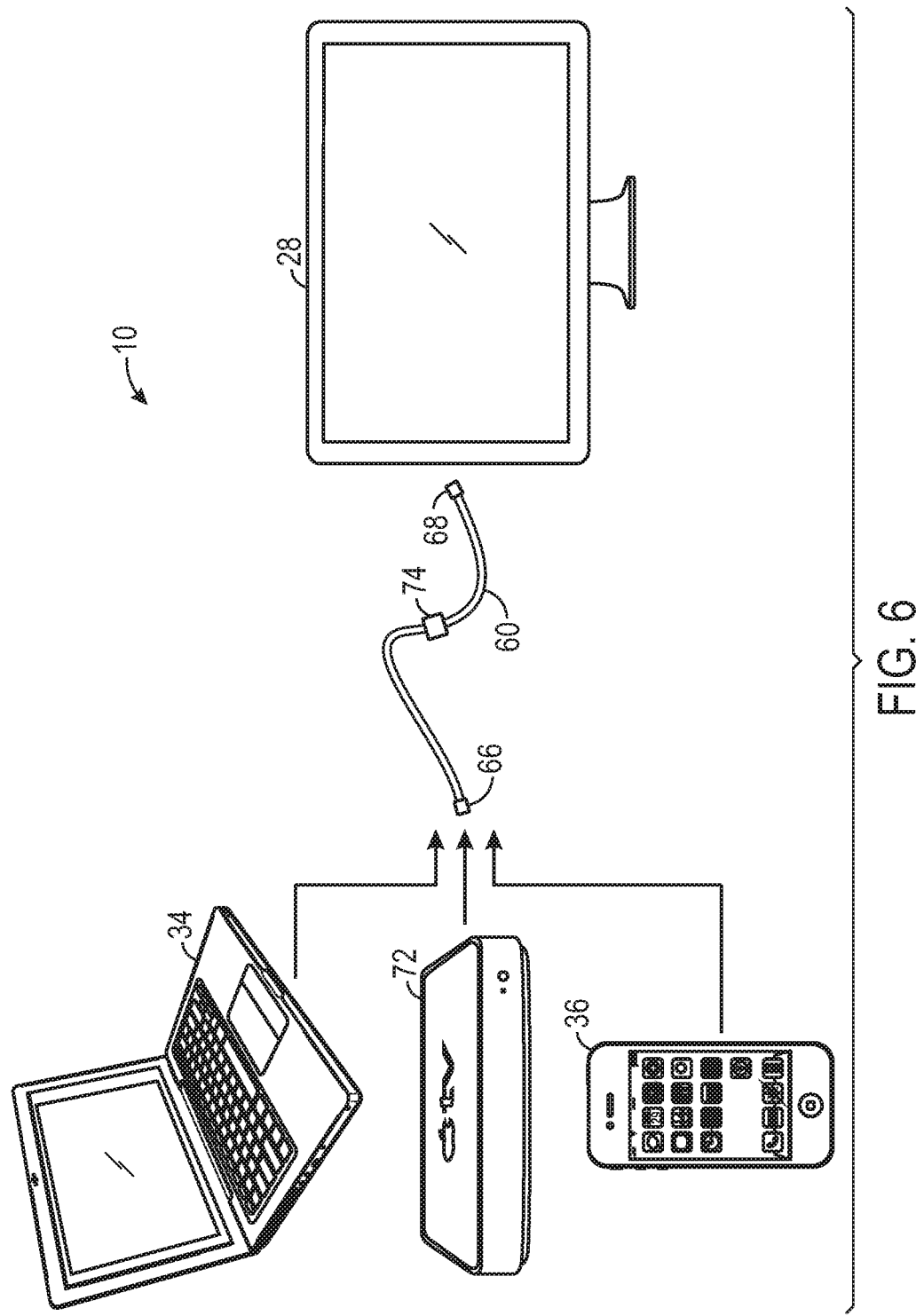
FIG. 6 is a perspective view of the electronic device, display device, and intervening image processing circuitry of FIG. 1, in accordance with aspects of the present disclosure.

Referring again to the electronic device 10, the image processing circuitry 60 and the electronic display 28, FIG. 6 illustrates several forms that the various devices may take. As mentioned above, the electronic device 10 may take the form of a computer 34, including computers that are generally portable (such as laptop, notebook, and tablet computers) as well as computers that are generally non-portable (such as desktop computers, workstations and/or servers). Additionally, the electronic device 10 may also take the form of a media distribution device 72, which may be a model of and Apple TV® available from Apple Inc. The electronic device 10 may also take the form of a handheld portable electronic device 36 (e.g., a portable media player or mobile phone), which may be a model of an iPod® or iPhone® available from Apple Inc.

FIG. 6 further illustrates an embodiment of the image processing circuitry 60, here shown integrated into a cable. It is to be noted that the image processing circuitry 60 may be integrated into a dongle, an expansion card, or any other suitable device. As shown, the image processing circuitry 60 may include an enclosure 74 suitable for housing the processor(s) 62, as well as the various other components discussed above with regard to the block diagram shown in FIG. 5. Additionally, the image processing circuitry 60 may include one or more input ports 66 (e.g., VGA, HDMI, dock connector) useful for connecting to the devices 34, 72, and 36. The cable may also include one or more output ports 68, as depicted, suitable for communicating with the electronic display 28.

As further shown, the electronic display 28 may be configured to generate various images that may be viewed by a user, such as inverse dithered images or video. The electronic display 28 may be a television, a computer monitor, a projector, or any device suitable for display images. The inverse dithered image may have been generated by the image processing circuitry 60 using, for example, spatial and temporal inverse dithering techniques described in more detail below. Accordingly, during operation of the devices 34, 72, and 36, dithered images may be generated and transmitted via the image processing circuitry 60. The image processing circuitry 60 may further inverse dither the dithered images, and transmit the inverse dithered images to the electronic display 28. The electronic display 28 may then present the images for visualization by a user.

Figure 7:
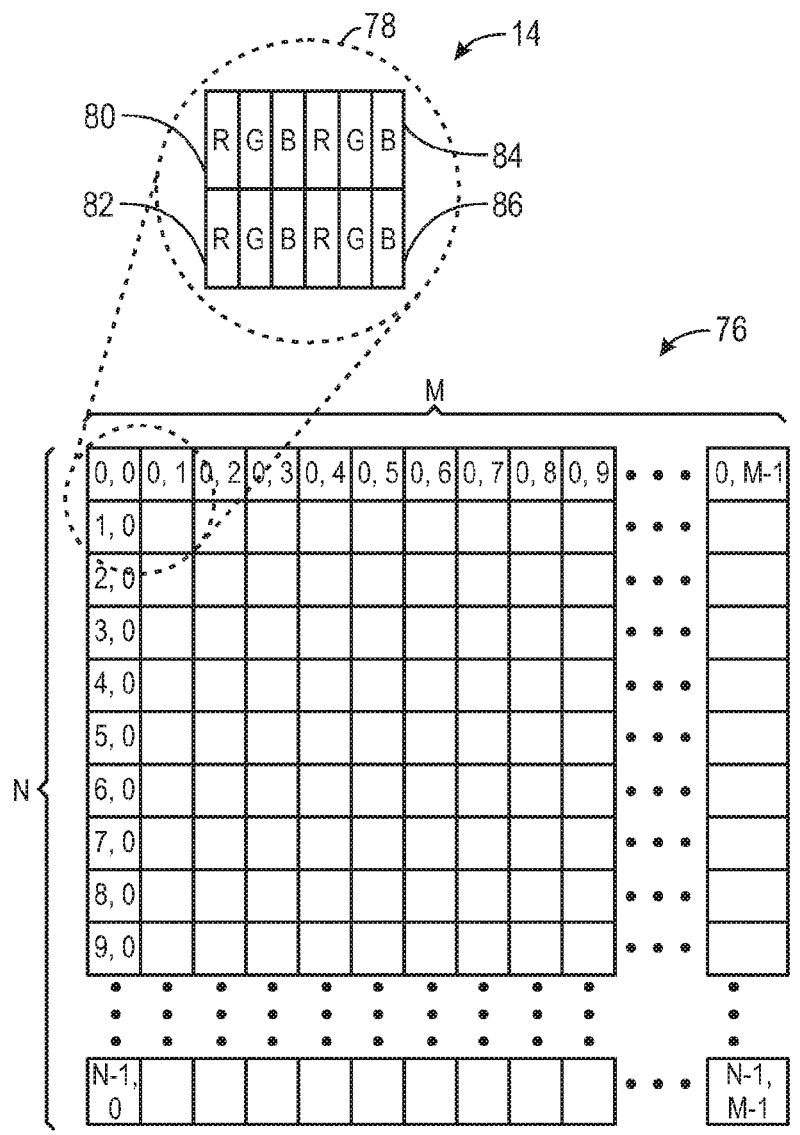
FIG. 7 shows a graphical representation of an M×N pixel array that may be included a display device, in accordance with aspects of the present disclosure.

Having provided some context with regard to various forms that the electronic device 10 and the electronic display 28 may take and now turning to FIG. 7, the present discussion will focus on details of the electronic display 28 and on certain image processing logic. As mentioned above, the electronic display 28 may be any suitable type of display, such as an LCD television, a plasma display, a projector, a monitor, and internal LCD screen, and so forth. The electronic display 28 may include a matrix of pixel elements such as an example M×N matrix 76 depicted in FIG. 7. Accordingly, the electronic display 28 is capable of presenting an image at a natural display resolution of M×N. For example, in embodiments where the electronic display 28 is included in a 30-inch Apple Cinema HD Display®, the natural display resolution may be approximately 2560×1600 pixels.

A pixel matrix 78 is depicted in greater detail and includes four adjacent pixels 80, 82, 84, and 86. In the depicted embodiment, each pixel of the electronic display 28 may include three sub-pixels capable of displaying a red (R), a green (G), and a blue (B) color. The human eye is capable of perceiving the particular RGB color combination displayed by the pixel and translating the combination into a specific color. A number of colors may be displayed by each individual pixel by varying the individual RGB intensity levels of the pixel. For example, a pixel having a level of 50% R, 50% G, and 50% B may be perceived as the color gray, while a pixel having a level of 100% R, 100% G, and 0% B may be perceived as the color yellow. Indeed, the pixel matrix 36 may be suitable for displaying a number of colors or grey levels.

The number of colors that a pixel is capable of displaying is dependent on the hardware capabilities of the electronic display 28. For example, a display 28 with a 6-bit color depth for each sub-pixel is capable of producing 64 ($2^6$) intensity levels for each of the R, G, and B color components. The number of bits per sub-pixel, e.g. 6 bits, is referred to as the pixel depth. At a pixel depth of 6 bits, 262,144 ($2^6 \times 2^6 \times 2^6$) color combinations are possible, while at pixel depth of 8 bits, 16,777,216 ($2^8 \times 2^8 \times 2^8$) color combinations are possible. Although the visual quality of images using an 8-bit pixel depth may be superior to the visual quality of images using 6-bit pixel depth, the cost of storing and transmitting the 8-bit pixel depth image is also higher. Accordingly, the electronic device 10 may apply a dithering technique to reduce, for example, the 8-bit pixel depth image into a 6-bit pixel depth image, while maintaining a visual quality that allows a human user to perceive the 6-bit pixel depth image with sufficient clarity. The dithering technique may change the RGB values in the pixels 80, 82, 84, and 86, either temporally, spatially, or both, so as to attempt to improve the visual display of the lower pixel depth image. However, when such a dithered image is transmitted to certain electronic displays 28, such as external displays 28, the electronic displays 28 may apply an additional image processing algorithm to the dithered image, such as an edge detection and enhancement algorithm. The edge detection and enhancement algorithm may find "false" edges in the dithered image due to quantization steps performed during dithering. These "false" edges may be amplified during the edge enhancement, resulting in artifacts such as halos and/or rings.

Additionally, the dithered image may use substantially less bandwidth for transmission. For example, a 24-bit source image may be reduced to an 8-bit dithered image, saving 16 bits for each pixel transmitted. As can be appreciated, the savings in transmission bandwidth for images having pixel counts (e.g., high definition video) may be quite substantial. Indeed, several channels of high definition (HD) video images may be transmitted as dithered images using the same or less bandwidth than that used by a single channel of undithered HD video images.

It would be beneficial to apply imaging processing techniques, such as the inverse dithering techniques described herein, that are capable of transforming a dithered image into an inverse dithered image so as to improve visual reproduction, particularly when the electronic display 28 applies further image processing techniques, such as edge detection and enhancement techniques. Accordingly, it would also be beneficial to apply inverse dithering techniques that are capable of improved visual representation of any number of colors and gray-scales. Indeed, the image processing techniques described herein, such as those described in more detail with respect to FIG. 8 below, are capable of displaying improved visual reproductions at any number of pixel depths from any number of source images that may have been dithered.

Figure 8:
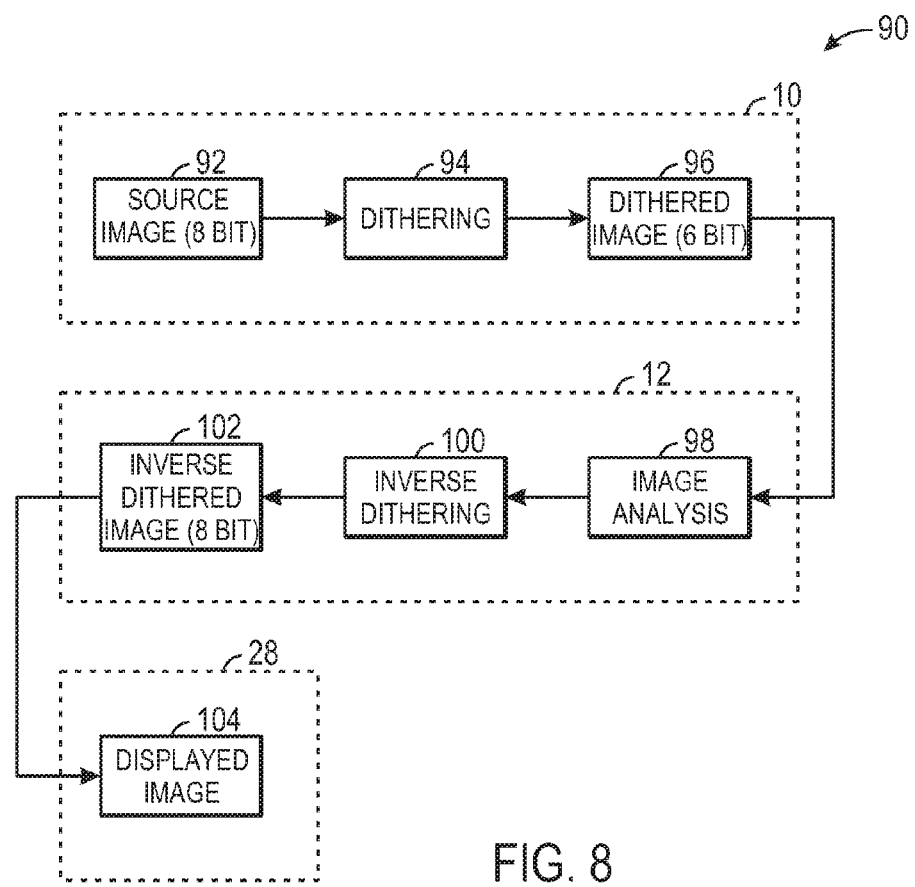
FIG. 8 is a block diagram illustrating an image signal processing (ISP) logic, in accordance with aspects of the present disclosure.

Turning to FIG. 8, the figure depicts an embodiment of an image signal processing (ISP) pipeline logic 90 that may be utilized for processing and displaying a source image 92. The ISP logic 90 may be implemented using hardware and/or software components included in the electronic device 10, the image processing circuitry 60, the TCON 52, and the electronic display 28 of FIGS. 1, 4, and 5. The source image 92 may be provided, for example, by placing an 8-bit electronic representation of the source image 92 onto the electronic device 10. The source image 92 may include colors or grey levels that are not directly supported by certain display hardware of the electronic device 10. For example, the source image 92 may be stored at a pixel depth of 8 bits while the display hardware includes a 6-bit pixel depth display hardware. Additionally or alternatively, the source image 92 may benefit from a reduction in the amount of bandwidth used during image data transfer. Accordingly, the source image 92 may be manipulated by applying a dithering process 94. The dithering process 94 may include any number of spatial and/or temporal dithering algorithms, such as the Floyd-Steinberg algorithm, the Burkes algorithm, the Stucki algorithm, the Sierra algorithm, and so forth. A 6-bit dithered image 96 is created based on the application of the dithering process 94 to the 8-bit source image 92.

The dithering algorithms may introduce a slight quantization error in the dithered image 96, resulting from a difference between the actual color values of the source image 92 and their corresponding dithered color values. Ordinarily, this quantization error is interpolated by the human eye to appear essentially the same as the original image. However, when additional image processing is applied to the dithered image, the quantization error may become magnified, giving the image a "grainy" or degraded appearance. Accordingly, certain image processing techniques may be applied so as to reduce or eliminate the introduction of quantization errors. Additionally or alternatively, certain image processing techniques may be applied so as to reduce bandwidth transmission requirements. In the depicted embodiment, an image analysis process 98 is performed on the dithered image 96. The image analysis 96 may include color decomposition of the dithered image 96. The color decomposition is capable of decomposing the color of each pixel of the dithered image 96 into the three RGB color levels. That is, the RGB intensity levels for each pixel may be determined by the color decomposition. Such a decomposition may be referred to as a three-channel (e.g., multi-channel) decomposition, because the colors may be decomposed into a red channel, a green channel, and a blue channel, for example. Accordingly, each color may be inverse dithered separately.

The image analysis 98 may be followed by the application of inverse dithering techniques 100. The inverse dithering techniques 100 may include spatial inverse dithering and/or temporal inverse dithering, enabling the creation of an inverse dithered image 102. In spatial inverse dithering, the pixels in the dithered image 92 may be manipulated so as to diffuse the energy in each pixel spatially to surrounding pixels, and make false edges of the image less detectable, as described in more detail below with respect to FIG. 11. Spatial inverse dithering may therefore convert the dithered image 96 into the inverse dithered image 102 having an improved the image perception and quality.

Additionally or alternatively, the inverse dithering techniques 100 may be capable of utilizing temporal inverse dithering. In temporal inverse dithering, the colors and/or grey levels of the pixels in the dithered image 96 may be varied frame-by-frame so as to improve the perceived image quality of the inverse dithered image 102. That is, a first frame of the processed image may be presented at time $T_0$, followed by a second frame of the processed image which may be presented at time $T_1$. The second frame may have color and/or gray level variations from the first frame. Likewise, a third frame of the processed image may be presented at time $T_2$ having colors and/or gray levels that differ from the second frame. Likewise, additional frames may then be presented also having color and/or grey level values that differ form the third frame.

Humans may perceive multiple frames presented sequentially one after the other as a single image. Indeed, in some embodiments, 15, 24, 30, 60, 120, 240, or more frames per second (FPS) may be presented sequentially. By alternating the color and/or the grey-levels of each frame and by presenting the frames sequentially, it is possible to enable a single perceived image that is more natural and pleasing to the human eye. Accordingly, the inverse dithering techniques 100 may be capable of temporal inverse dithering. Indeed, the spatial and/or temporal inverse dithering techniques allow for the visually pleasing presentation of a displayed image 104, even when the displayed image 104 undergoes additional image processing, such as edge detection and enhancement.

Figure 9:
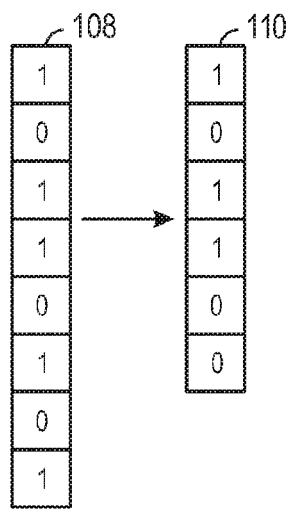
FIG. 9 is a block diagram of an embodiment of an original pixel having a higher pixel depth and a dithered pixel having a lower pixel depth.

FIG. 9 is illustrative of an embodiment of a conversion of a single color or grey-scale pixel 108 having a higher pixel depth (e.g., 8 bits) into a pixel 110 having a lower pixel depth (e.g., 6 bits). In the depicted embodiment, the pixel 108 is stored in 8 binary bits having the values "10110101." One method of achieving of a lower pixel depth value (e.g., 6-bit value), would involve discarding the last two bits (i.e., least significant bits) of the pixel 108. In the illustrated example, such a method would result in the 6-bit value of "101101." However, discarding the least significant bits of the pixel 108 is likely to result in an image having visual anomalies, such as "banding," in which stepwise or color bands appear in the lower pixel depth image. Accordingly, the pixel 108 may be dithered to arrive at the lower depth pixel 110. By dithering all the pixels in the source image 92, a more visually pleasing dithered image 96 may be displayed.

As mentioned previously, various dithering algorithms, such as the Floyd-Steinberg algorithm, the Burkes algorithm, the Stucki algorithm, the Sierra algorithm, and so forth, may be used. These algorithms may evaluate pixels surrounding the pixel 108 and compute the value of the pixel 110 so that the image looks more visually uniform. In the depicted example, the dithered pixel 110 has the value "101100." The dithered pixels of the dithered image 96, including dithered pixel 110, may then be output.

Figure 10:
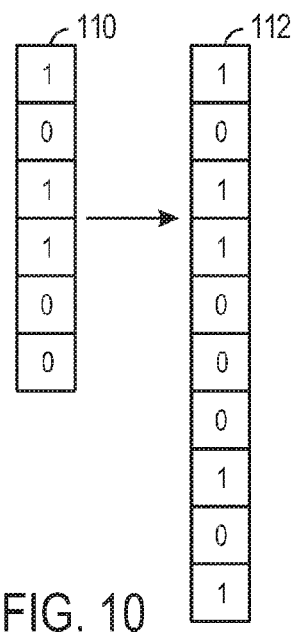
FIG. 10 is a block diagram of an embodiment of a dithered pixel having a lower pixel depth and an inverse dithered pixel having a higher pixel depth.

FIG. 10 is illustrative of an embodiment of an inverse dithering of the dithered single color or grey-scale pixel 110 of FIG. 9 into a pixel 112 having a higher pixel depth (e.g., 10 bits). That is, the 6-bit pixel 110 may be inverse dithered so as to result in the 10-bit pixel 112. Indeed, inverse dithering may be used to convert a lower pixel depth pixel into any higher pixel depth pixel. For example, a 4-bit dithered pixel may be inverse dithered into a 12-bit pixel. Likewise, a 6-bit pixel dithered pixel may be inverse dithered into an 8-bit, pixel.

In the illustrated embodiment, the dithered image 96 (show in FIG. 8) having a dithered pixel 110 may be transmitted into, for example, the image processing circuitry 60 or the TCON 52. The transmission of the dithered image 96 may use substantially less bandwidth because of the reduced number of bits when compared to the original source image 92. The electronic display 28 may have display hardware capable of displaying images at a higher pixel depth, such as a 10-bit pixel depth. Accordingly, the image processing circuitry 60 or the TCON 52 may inverse dither the dithered image 96, including the pixel 110, so as to display the dithered image 96 at a higher, more visually pleasing, pixel depth (e.g., 10-bit pixel depth). Inverse dithering of the pixel 110 may be performed by using several methods. One of the methods may involve a simple addition of zeros to the end bits (i.e., least significant bits) of the higher pixel depth pixel in order to fill bits removed during dithering. For example, the 6-bit value "101100" may be converted into a 10-bit value "1011000000." Another method may add ones to the least significant bits of the higher pixel depth image. For example, the 6-bit value "101100" may be converted into a 10-bit value "1011001111." However, such methods typically result in display artifacts called "banding" and are aesthetically displeasing. Accordingly, the inverse dithering techniques described herein may be applied that are more suitable for enhancing the visual qualities of the display image. For example, an energy diffusion inverse dithering may be applied, suitable for diffusing the energy in a pixel, as described below with respect to FIGS. 12 to 14. The energy diffused inverse dithered pixel 112 may result in a more improved visual presentation than simple addition of ones or zeros the least significant bits. Indeed, the inverse dithered least significant bits of the pixel 112 may carry information that enables a substantial visual improvement over the simple addition of all ones or all zeros. Further, the inverse dithered image may allow the application of edge detection and enhancement algorithms that may prevent or eliminate undue visual changes such as the detection of false edges.

Figure 11:
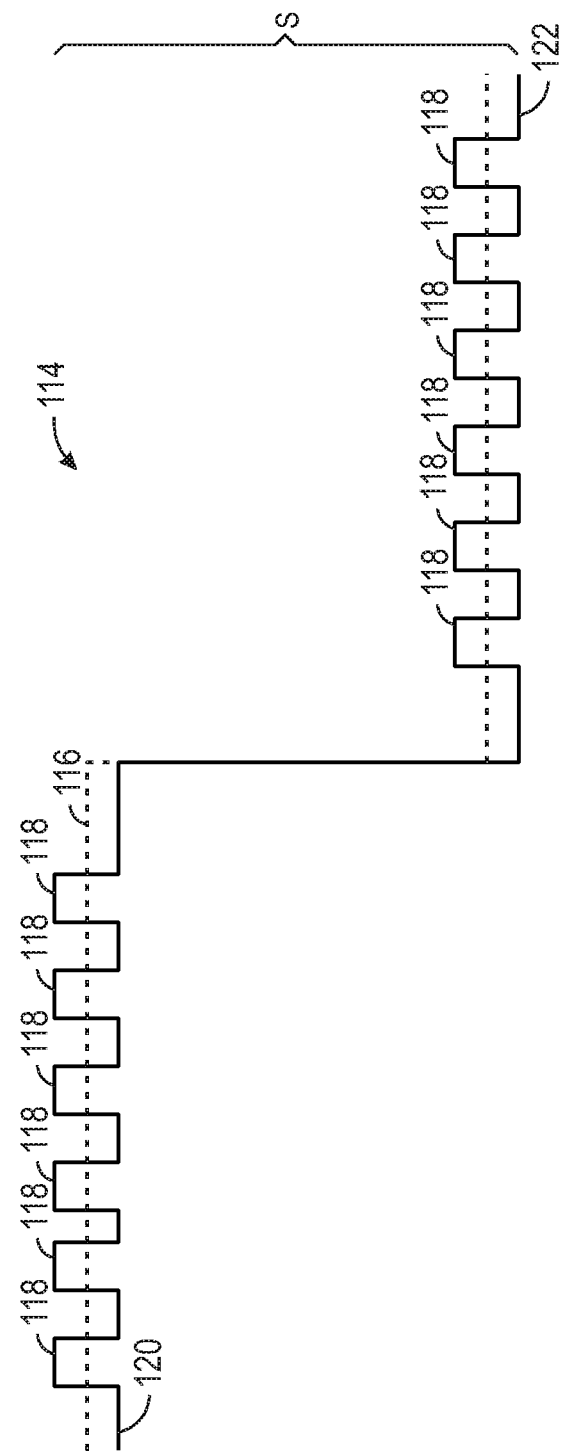
FIG. 11 is a diagram illustrating an embodiment of dithered and inversed dithered pixels across a true image edge.

In certain embodiments, the display 28 may apply edge enhancement algorithms so as to produce a sharper, more aesthetically pleasing image. However, certain dithered images may result in false edges. FIG. 11 depicts an embodiment of an inverse dithering applied around an image edge 114 to prevent or eliminate false edges. That is, when inverse dithering is applied to the image edge 114, a real edge (depicted as a dashed line inverse dithered edge 116) is preserved while false edges 118 (depicted as solid line false edges 118) resulting from dithering are eliminated. More specifically, the image edge 114 may have been derived by using an edge enhancement algorithm that has resulted in the image edge 114 having a separation S between a high value 120 and a low value 122 of the edge. Indeed, the edge enhancement algorithm is suitable for detecting edges in an image and deriving an edge 114 having a separation S, where S is suitable for optimizing the image's perceived sharpness. However, the edge enhancement algorithm may incorrectly derive multiple false edges 118. The edges 118 may result from the edge enhancement algorithm interpreting certain quantization steps in the dithered image 96 as edges, and then increasing the local contrast, which results in the false edges 120. When the image is displayed, the false edges 120 may be perceived as a series of halos or rings. Accordingly, it would be beneficial to provide for a mechanism to smooth out the quantization steps in the dithered image 96, as described in more detail with respect to FIG. 12 below. Indeed, by using the techniques described herein, the edges 120 may be made more uniform, as depicted the inverse dithered edge 116 (e.g., depicted with dashed lines). By displaying the inverse dithered edge 116, the display artifacts such as halos or rings may be substantially removed or eliminated. Additionally, a true or real image edge 116 is preserved, which may result in the display image having a sharper, more aesthetically pleasing image.

Figure 12:
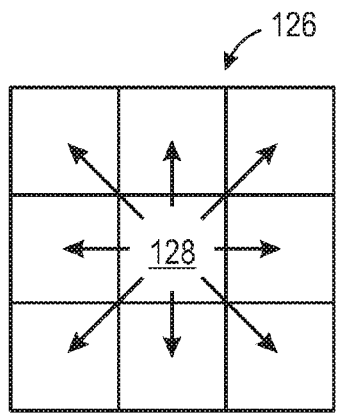
FIG. 12 is a diagram illustrating an embodiment of an inverse dithering process across a 3×3 image area.

Turning to FIG. 12, the figure illustrates an embodiment of an inverse dithering of an image area or kernel 126 of the dithered image 96 by using an energy diffusion or distribution. In the depicted embodiment, a center pixel 128 having a color value c is selected. A prediction pixel value P may then computed based on a function of neighboring pixel values of the kernel 86. For example, the pixel value P may be computed by summing a color value (e.g., red, green, blue) of all of the pixels in the image area 126. In one embodiment, the sum is then divided by the number of neighboring pixels (e.g., 9), resulting in an average $\overline{A}$. That is, the average $\overline{A}$ includes all pixel values in the image area 126 divided by the number of pixels in the image area 126. The difference between $\overline{A}$ and c is then used to create a diffusion value Δ. In certain embodiments, the diffusion value Δ may be limited to a certain range {−Q . . . +Q} based in part on the quantization steps used during the initial dithering process. For example, if the dithering converted an image from an 8-bit source image into a 6-bit dithered image, two bits were used in quantization. Therefore, the quantization step is $2^2$ (i.e., 4) and the range may be limited to {−4 . . . +3}. In another example, if the dithering converted an image from a 10-bit source image into a 7-bit dithered image, three bits were used in quantization. Therefore, the quantization step is $2^3$ (i.e., 8) and the range may be limited to {−8 . . . +7}.

The range-limited diffusion value Δ is then subtracted from the center pixel 128. In other words, the center pixel 128 will have the range-limited value Δ subtracted from its current value c. Energy removed from the center pixel 128 is then added back to the image area 126. In one embodiment, an equal distribution is used to distribute the removed energy. In this equal distribution embodiment, the range-limited value Δ is divided by 8, and this value is then added to the eight pixels surrounding the center pixel 128. In other embodiments, a weighted distribution, a random distribution, a weighted-by-filter-kernel distribution, or a weighted-by-directional-filter distribution may be used to diffuse or distribute the energy. In error or energy distribution, for example, one of the neighboring pixels may be given more weight and thus would receive more of the subtracted energy. In random distribution, the subtracted energy would be randomly divided among all of the neighboring pixels. In weighted by filter kernel distribution, a filter may be applied, such as a color filter assigning more of the subtracted energy to certain neighboring pixels due to their color profiles. In a weighted by directional filter distribution, a directional filter may be applied, which may assign the subtracted energy based on certain frequency profiles of the image area 126. By diffusing some of the energy in the center pixel 128 to neighboring pixels, image enhancement algorithms such as edge detection and enhancement that may be used in the display 28 may not enhance/magnify false edges.

Figure 13:
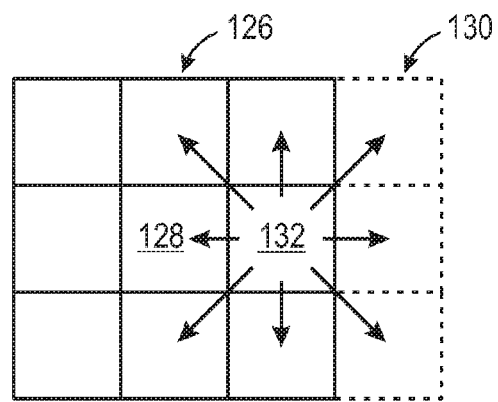
FIG. 13 is a diagram illustrating an embodiment of the inverse dithering process of FIG. 12 across two 3×3 image areas.

The inverse dithering technique may then be applied to a neighboring image area 130, as described below with respect to FIG. 13, until the totality of the dithered image 96 has been converted into an inverse dithered image 102. FIG. 13 depicts an embodiment of a neighboring 3×3 image area 130 having a center pixel 132. In the depicted embodiment, the center pixel 132 of the image area 130 is immediately adjacent to the center pixel 128 of the image area 126. Indeed, the inverse dithering techniques described herein may iteratively process other image areas, such as the image area 130, until the entirety of the dithered image 96 has been processed and converted into an inverse dithered image 102. Thus, the new image area 130 and center pixel 132 may undergo the same analysis and processing as described above with respect to FIG. 12. That is, the center pixel 132 may have energy removed or added, and the energy may then be diffused or distributed to or from the neighboring pixels in the image area 130. Indeed, the inverse dithering process may continually select and process a new image area and center pixel until all of the pixels in the dithered image area 96 have been processed as center pixels, as shown in FIG. 12. It is to be understood that any method of selecting the new image area may be used, such as selecting the image area immediately to the right, immediately to the left, immediately on top, immediately on bottom, a non-immediate area, a randomly selected area, and so forth.

Figure 14:
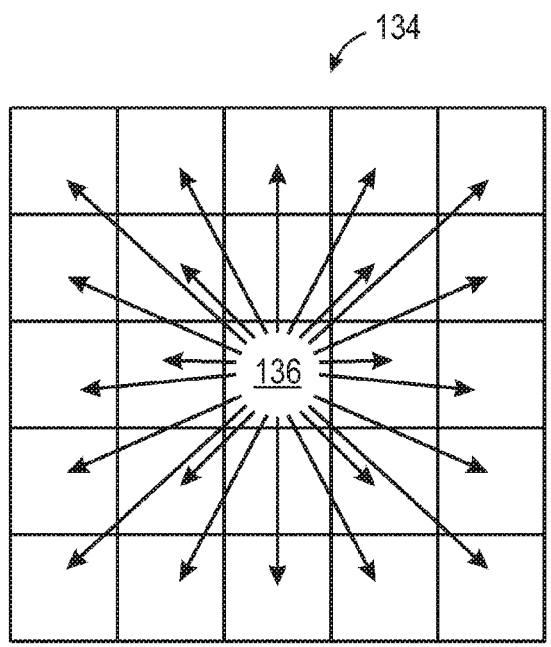
FIG. 14 is a diagram illustrating an embodiment of an inverse dithering process across a 5×5 image area.

The inverse dithering is not restricted to 3×3 image areas, but may also process image areas having other sizes or non-rectangular shapes, as described in more detail below with respect to FIG. 14. FIG. 14 depicts a 5×5 image area 134 having a center pixel 136. As mentioned above, the process for inverse dithering by using energy diffusion or distribution is not limited to only 3×3 image areas or kernels. Any number of image area sizes may be used, such as 2×2, 4×, 4, 8×8, 20×20, and so forth. In the depicted embodiment having the 5×5 image area 134, the center pixel 136 is analyzed as described above. That is, the prediction pixel value P may be computed based on an function of all the pixel values in the image area 134. In one embodiment, function used is an average $\overline{A}$ function where all of the pixel values in the image area 134 are summed and then divided by the total number of pixels in the image area 134 (e.g., 25). When the image area 134 is a 5×5 image area, the neighboring pixels are not all directly adjacent to the center pixel 136 because the image area 134 includes a larger size, as depicted. The average $\overline{A}$ is then compared to the value c of the center pixel 136. The difference between $\overline{A}$ and c is then used to create a diffusion value Δ. In certain embodiments, the diffusion value Δ may be limited to a certain range {−Q . . . +Q} based in part on the quantization steps used during the initial dithering process, as described above. The range-limited diffusion value Δ is then subtracted from the center pixel 136. Energy removed from the center pixel 136 is then added back to the image area 134. In one embodiment, an equal distribution is used to distribute the removed energy. In this equal distribution embodiment, the range-limited value Δ may be divided by 24, and this value is then added to the 24 pixels surrounding the center pixel 128. As mentioned above, other energy diffusion or distribution embodiments may include a weighted-distribution, a random distribution, a weighted-by-filter-kernel distribution, or a weighted-by-directional-filter distribution. By using the 5×5 image area or kernel 134, the energy may be diffused over a larger area.

Figure 15:
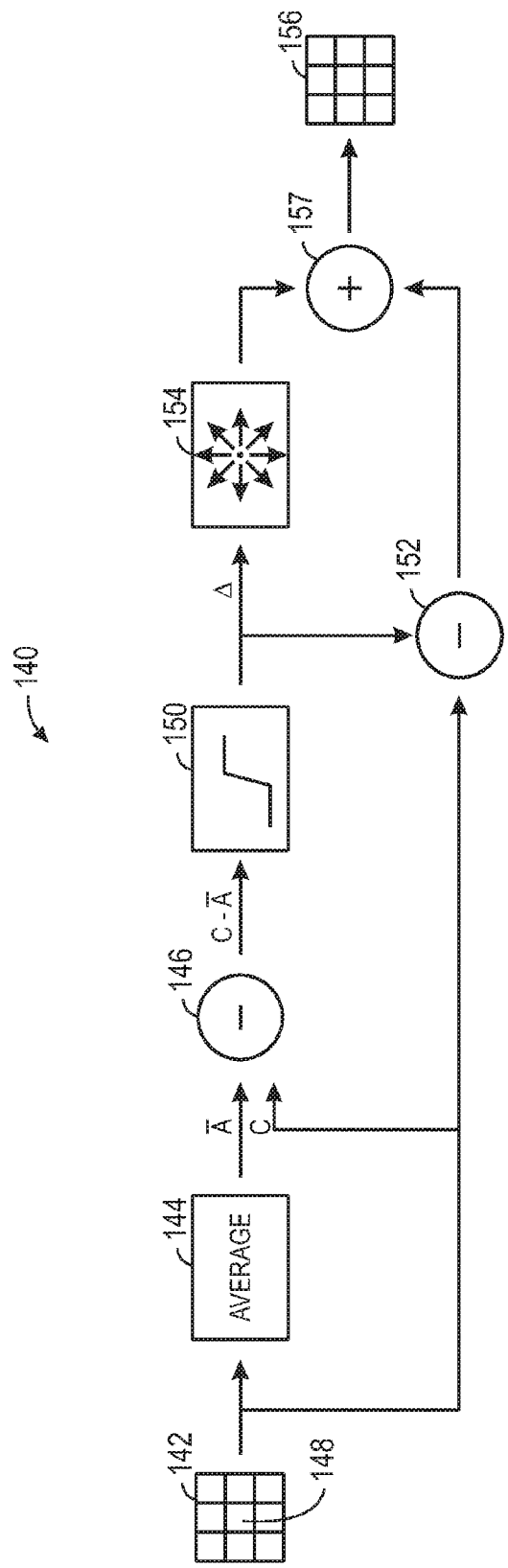
FIG. 15 is a block diagram of an embodiment of an inverse dithering system.

FIG. 15 depicts a system 140 suitable for inverse dithering an image by using the energy diffusion approach described above with respect to FIGS. 12-14. In the illustrated example, an image area 142 is first processed by an averager 144 to arrive at the average value $\overline{A}$, where the average value $\overline{A}$ is computed by summing a color value (e.g., red, green, blue) or the grey-scale value of the pixels in the image area 142 and dividing the sum by the number of pixels in the image area 142. A subtractor 146 may then subtract the average $\overline{A}$ from a value c corresponding to a color or grey-scale value for a center pixel 148 of the image area 142 to obtain an error value c−$\overline{A}$. A limiter 150 may then be used to limit the c−$\overline{A}$ difference to a range-limited value Δ. The range limiter 150 may use a quantization step used for dithering the image area 142 to derive the range-limited value Δ. Indeed, the range limiter 150 may preserver real edges by limiting only edges having values inside the range-limited value Δ. Accordingly, the limiter 150 may aid in removing false edges.

A subtractor 152 may then be used to subtract the value outputted by the range limiter 150 from the center pixel value c. In one example, the value used as input (i.e., c−$\overline{A}$) for the range limiter 150 may fall inside the quantization range. That is, there no true edge is detected and the value c−$\overline{A}$ is not range limited. Accordingly, the range limiter 150 may not need to modify the input value c−$\overline{A}$. In this example, the subtractor 152 may subtract the value c−$\overline{A}$ from the center pixel value c (i.e., c−(c−$\overline{A}$)), resulting in the value $\overline{A}$. In another example, the c−$\overline{A}$ value used as input to the range limiter 150 may fall outside of the quantization range. That is, there is a true edge and thus the range limiter 150 may limit the range so as to preserve the true edge in the image. Accordingly, the range limiter 150 may modify the input value c−$\overline{A}$ and output the range limited value Δ. In this example, the subtractor 152 may subtract range limited value Δ from the center pixel value c, resulting in the value c−Δ.

A diffuser 154 may then diffuse or distribute the value calculated by the subtractor 152 to other pixels of the image area 142, resulting in an inverse dithered image area 156. For example, the diffuser 154 may use an adder 157 to add certain portions of the value outputted by the subtractor (e.g., $\overline{A}$ or c−Δ) to neighboring pixels in the image area 142. The portions may be equal portions, or unequal portions. Indeed, an equal distribution, a weighted distribution, a random distribution, a weighted-by-filter-kernel distribution, or a weighted-by-directional-filter distribution may be used by the diffuser 154 to diffuse the energy value subtracted by the subtractor 152. By diffusing the energy subtracted from the center value c, the inverse dithered image area 156 may be made more uniform and pleasing to the human eye.

Figure 16:
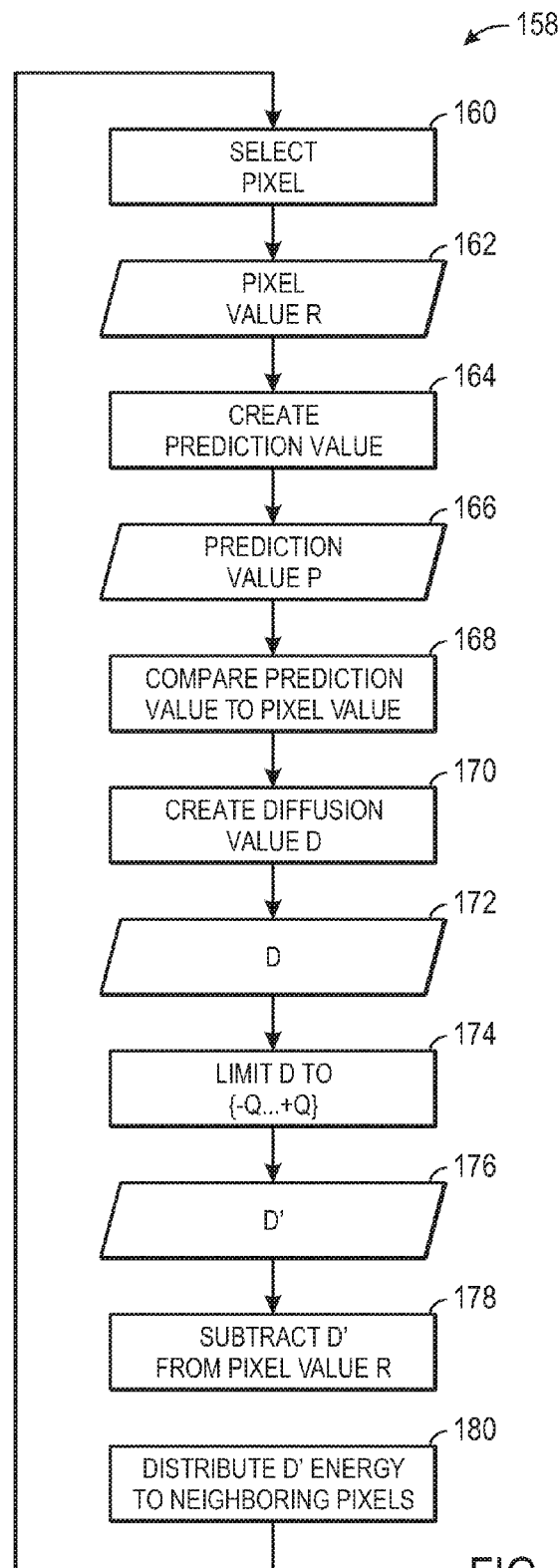
FIG. 16 is a flow chart illustrating an embodiment of an inverse dithering logic.

FIG. 16 depicts an embodiment of a logic 158 suitable for inverse dithering a dithered image by using energy diffusion. The logic may first select a pixel (block 160), such as a center pixel of an image area or kernel of the dithered image. A pixel value R 162, such as a color value or grey-scale value c for the selected center pixel may then be calculated. The logic 158 may then create a prediction value (block 164), such as a prediction value P 166. In one embodiment, the prediction value may be created (block 164) by deriving an average value of all pixels in the image area or kernel, such as the value $\overline{A}$ described above with respect to FIG. 15. For example, the average value may be derived as the sum of the values of pixels neighboring the selected pixel, and then this sum may be divided by the number of neighboring pixels. The prediction value P may then be compared to the pixel value R (block 168). The comparison of the prediction value P to the pixel value R is used to create a diffusion value D 172. The diffusion value D is created by subtracting the predicted value P from the pixel value R. The diffusion value D may then be range limited, for example, to a quantization range {−Q . . . +Q} (block 174). In certain embodiments, the values for Q may be derived based on the quantization steps used to produce the dithered image. A range-limited D' 176 may then be subtracted from the pixel value R (block 178). In one example, the range-limited the range-limited D' 176 may include a value $\overline{A}$ suitable for preserving a real edge in the image area. In another example, the range-limited D' 176 may include a value c−Δ suitable for removing false edges in an image. The energy removed by this subtraction of D' may then be distributed to the neighboring pixels (block 180). That is, D' may be divided proportionally or disproportionally among the neighboring pixels. For example, an equal distribution, a weighted distribution, a random distribution, a weighted-by-filter-kernel distribution, or a weighted-by-directional-filter distribution may be used to add certain portions of the value D' to the neighboring pixels. The logic 158 may then iteratively select another pixel in the dithered image (block 160). Indeed, the logic 158 may iteratively process each pixel of the dithered image 96 until the entire dithered image 96 has been inverse dithered. The inverse dithered image 102 may then be transmitted, for example, into the electronic device 28 for display. The electronic device 28 may apply edge enhancement algorithms, but the inverse dithered image 102 may still display an aesthetically pleasing image without exhibiting artifacts such as halos and rings.

Figure 17:
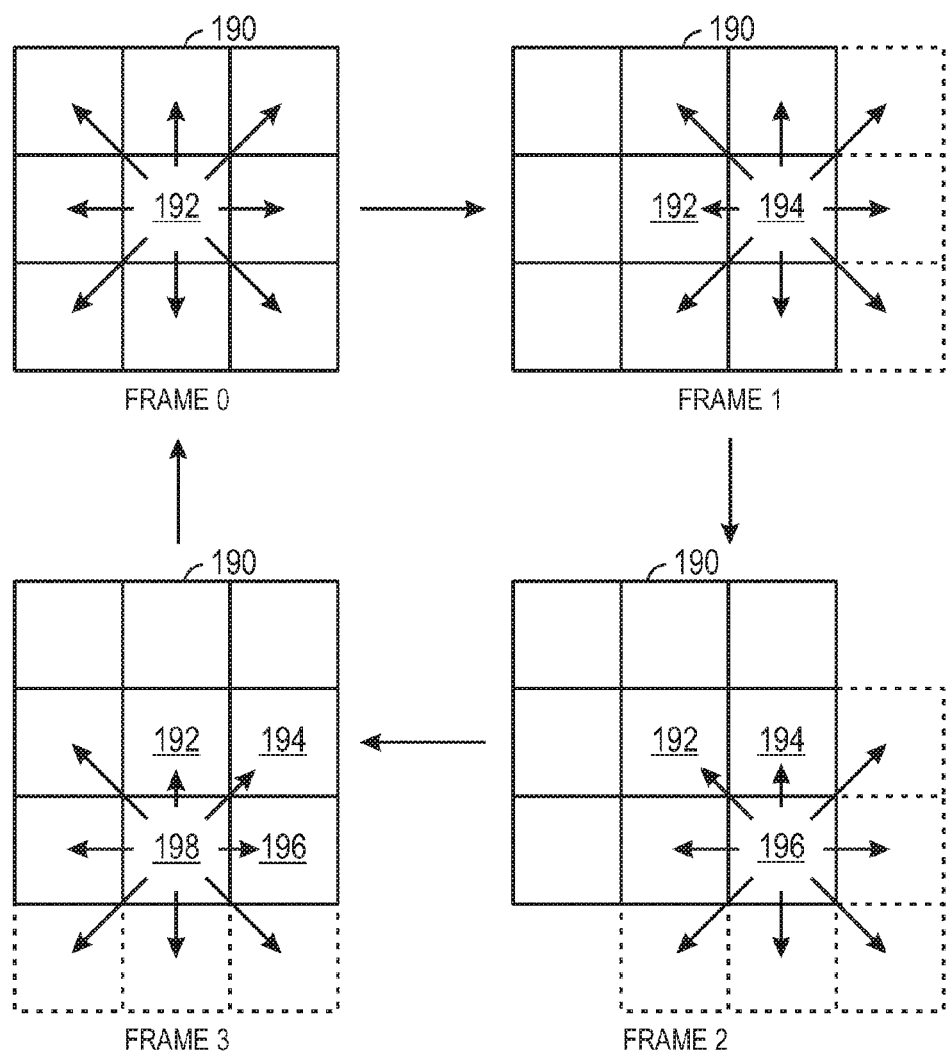
FIG. 17 is a diagram illustrating an embodiment of a temporally inverse dithered image area.

FIG. 17 is illustrative of an image area 190 undergoing temporal inverse dithering. In temporal inverse dithering, adjacent pixels may be color-shifted with respect to each other and the color (or grey-scale) values of certain pixels are temporally varied with color (or grey-scale) values of other pixels in the group. In one embodiment, the image area 190 at frame 0 (i.e., time 0) may first have a center pixel 192 selected. The image area 190 and center pixel 192 may then be processed as described above with respect to FIG. 12 so as to inverse dither the image area by applying energy diffusion over some period of time. At frame 1 (i.e., time 1), a new center pixel 194 may then be selected. The same process described above may be applied to inverse dither based on the energy of pixel 194. Likewise, at frame 2 (i.e., time 2), center pixel 196 may be selected and inverse dithering applied. Finally, at frame 3 (i.e., time 3), center pixel 198 may be selected and inverse dithering similarly applied. The cycle may then repeat itself, starting back at frame 0. Indeed, by alternating the color and/or the grey-levels of each frame 0-3 and by presenting the frames sequentially, it is possible to enable a single perceived image that is more natural and pleasing to the human eye. It is to be noted that the frames may be cycled in any order, such as the clockwise cycle depicted in FIG. 17. Other cycles may include counterclockwise and random cycles.

Figure 18:
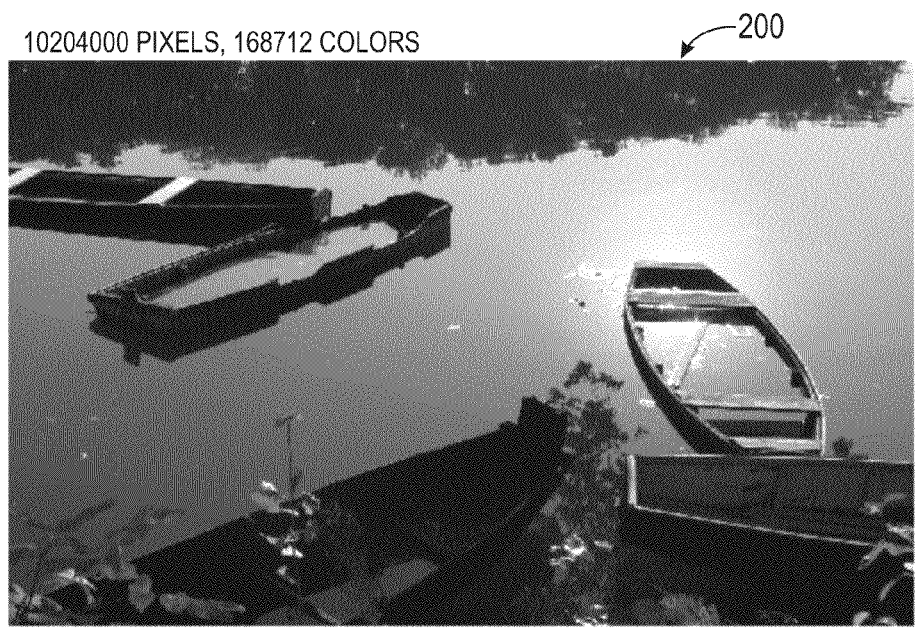
FIG. 18 depicts an embodiment of a source image.

Turning to FIG. 18, the figure illustrates an embodiment of a color source image 200 having approximately 168,712 different colors distributed across approximately 10,204,000 pixels. The color source image 200 is illustrative of a higher pixel depth image suitable for providing a high quality visual display image. In the depicted example, the subject matter includes a series of boats, along with a reflection of trees and the sun in water. The source image 200 depicts the subject matter's colors and shapes in a visually pleasing manner, but uses a high number of colors to do so.

Figure 19:
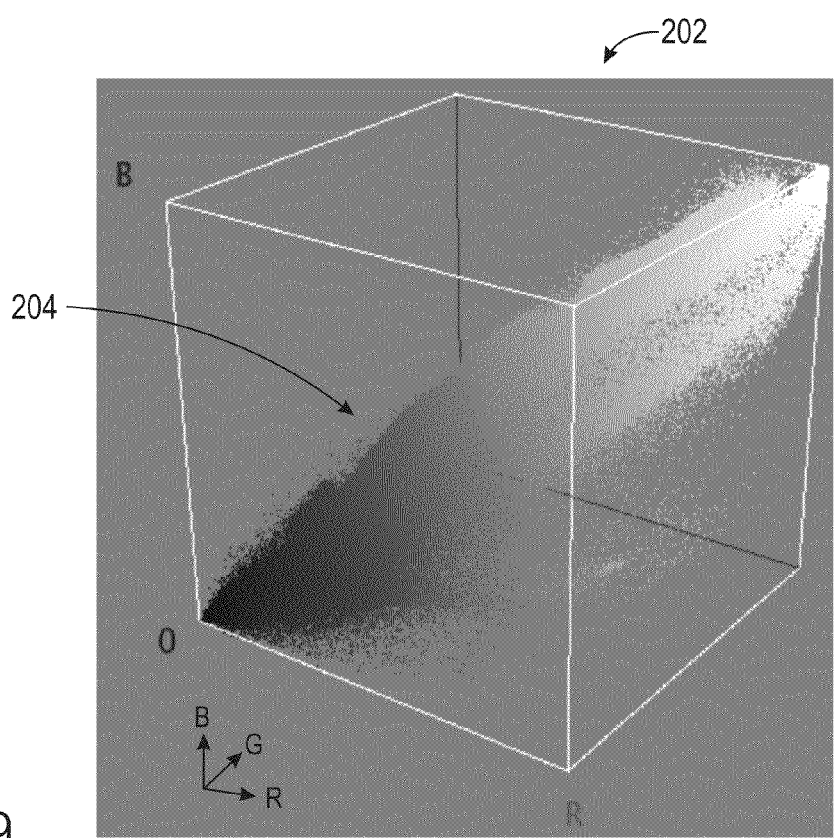
FIG. 19 depicts an embodiment of a color cube corresponding to the source image of FIG. 18.

Indeed, a color cube 202 corresponding to the number of colors included in the source image 200 is depicted in FIG. 19. The color cube 202 includes three axes, R, G, and B. Each color in the source image 200 is plotted in the depicted color cube 202. For example, the color gray includes 50% red, 50% green, and 50% blue. Accordingly, the color grey may be plotted as the point approximately halfway between each of the axes R, G, and B of the color cube 202. By plotting all of the colors in the source image 200, a color distribution 204 for the source image 200 is displayed in the color cube 202. The color distribution 204 visually depicts how much volume of the color cube 202 is used to store the colors of the source image 200, as well as the locations in the color cube 202 used for storage. The number of colors in the source image 202 may be reduced by using, for example, dithering techniques such as the Floyd-Steinberg dithering algorithm, without undue degradation in image quality.

Figure 20:
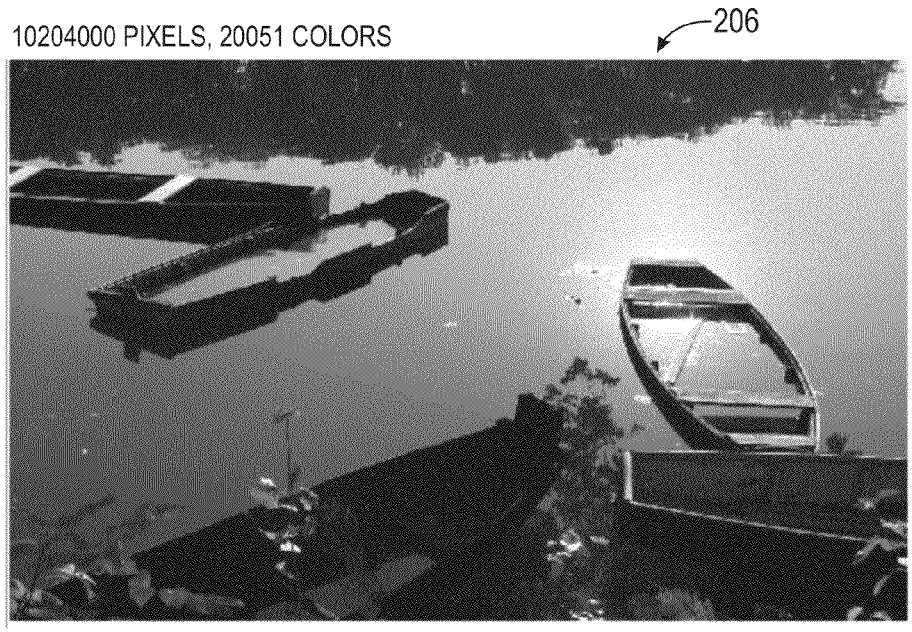
FIG. 20 depicts an embodiment of a dithered image based on the source image of FIG. 18.

FIG. 20 illustrates an embodiment of a dithered image 206 produced by dithering the color source image 200 (shown in FIG. 18). Dithering enables the creation of a dithered image having a lower pixel depth or number of colors. Indeed, the dithered image 206 includes 10,204,000 pixels having 20,051 colors, a substantial reduction in color quantity from the original 168,712 colors of the color source image 200. By having a reduced color palette, the dithered image 206 may be more easily transmitted, and may be processed using simpler and less costly imaging processing hardware. The use of dithering techniques also enables the dithered image 206 to more uniformly use the available colors, without displaying too may visual anomalies such as color banding. However, the dithered image 206 may still display a certain amount of color banding, for example in regions of the image having very different color values (e.g., near the image of the sun).

Figure 21:
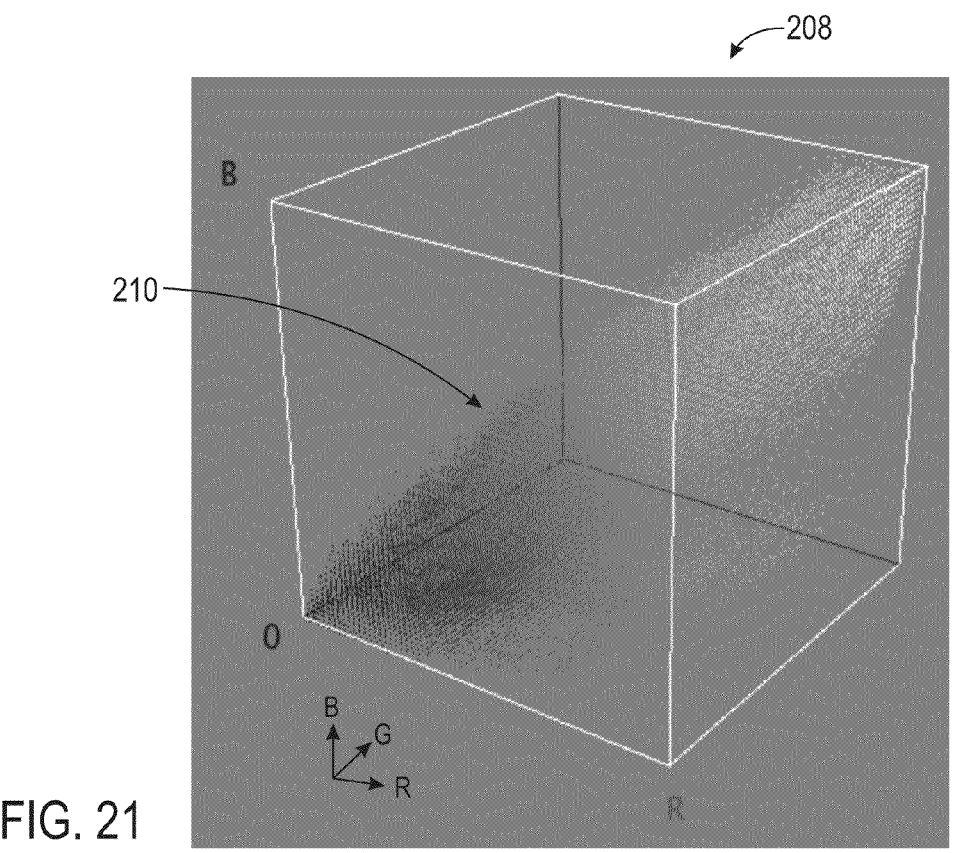
FIG. 21 illustrates an embodiment of a color cube corresponding to the dithered image of FIG. 20.

FIG. 21 illustrates an embodiment of a color cube 208 corresponding to the dithered image 206 of FIG. 20. In the depicted embodiment, the color cube 208 includes a substantially decreased number of plotted colors. Indeed, the color cube 208 includes a more "porous" color distribution 210 as compared to the color distribution 204 of FIG. 19. That is, the plotted color points in the color distribution 210 have spaces or interstices not shown in the color distribution 204. These spaces are the result of the elimination of approximately 148,661 out of 168,712 colors from the original color distribution 204. Indeed, approximately 88% of the colors present in the color distribution 204 have been eliminated. The substantial reduction in colors enables for improved image compression and a corresponding reduction in the transmission time used to send the dithered image 206.

Figure 22:
FIG. 22 depicts an embodiment of an inverse dithered image based on the dithered image of FIG. 20.
Figure 23:
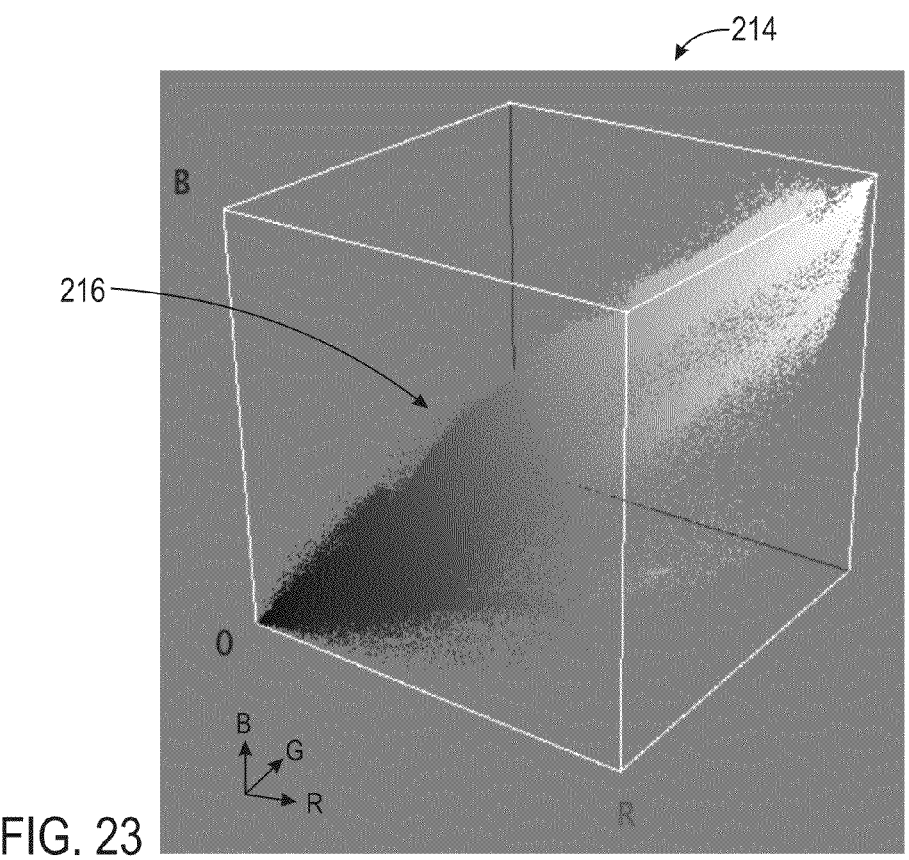
FIG. 23 illustrates an embodiment of a color cube corresponding to the inverse dithered image of FIG. 22.

The dithered image 206 may be processed using the inverse dithering techniques described herein, to produce an inverse dithered image having an improved visual display. FIG. 22 depicts an embodiment of an inverse dithered image 212 derived by using the inverse dithering techniques described herein. In the depicted embodiment, the inverse dithered image 212 is derived from the dithered image 208 of FIG. 20. More specifically, the inverse dithered image 212 has been derived by the applying the energy diffusion-based inverse dithered techniques described above with respect to FIGS. 12-17, to the dithered image of FIG. 20. For example, each of the pixels in the dithered image 212 may have been color analyzed and subsequently diffused so that neighboring pixels receive some measure of energy from the analyzed pixel, producing the inverse dithered image 212. The inverse dithered image 212 includes approximately 143,375 colors, of which approximately 123,324 colors may have been derived by applying energy diffusion to pixels of the dithered image 168. Indeed, the application of the inverse dithering techniques may result in a more visually appealing image lacking visual artifacts such as banding and false edges. Further, the additional colors derived through inverse dithering result in the inverse dithered image 212 having a visual appearance that makes it almost indistinguishable from the original source image 200 of FIG. 18.

Indeed, the inverse dithered image 212 having a color cube 214 illustrated in FIG. 22 shows a color distribution 216 that improves upon the color distribution 210 of FIG. 21 by deriving substantially more colors (e.g., 123,324 colors) through inverse dithering. As depicted, the color distribution 216 is less "porous" and is more uniform. Further, the color distribution 216 more closely approximates the color distribution 204 (shown in FIG. 19) of the original source image 200, when compared to the color distribution 210. Accordingly, the displayed image 212 more closely approximates the original source image 200. Further, the displayed image 212 lacks unsightly visual artifacts such as halos or shadows.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. An inverse-dithering method for processing a source dithered image comprising:
assigning one or more adjacent dithered pixels to an image area;
determining a prediction pixel value based on an average pixel value of the image area;
determining a difference between the prediction pixel value and a color value of a pixel of the image area;
assigning the difference between the prediction pixel value and the color value to a diffusion value;
limiting the diffusion value during inverse dithering of the source dithered image by keeping the diffusion value inside of a quantization range;
determining an energy by subtracting the diffusion value from the color value; and
distributing the energy to adjacent pixels.

2. The method of claim 1, wherein the quantization range comprises between $\{-Q \ldots +Q\}$ where N comprises a number of bits lost in a quantization of the dithered pixels, $-Q=-2^N$, and $+Q=2^N-1$.

3. The method of claim 1, wherein the energy distribution comprises an equal energy distribution, a weighted energy distribution, a random weight distribution, or combination thereof.

4. The method of claim 1, wherein the image area comprises a 3×3 pixel image area.

5. The method of claim 1, wherein the prediction pixel value comprises an average value derived by summing a color value for all pixels in the image area and dividing the sum by a number of pixels in the image area.

6. An article of manufacture comprising non-transitory computer-readable medium comprising code configured to:
analyze an image data from an image area of a dithered image;
inverse dither the image data by diffusing an energy from a center pixel of the image area into surrounding pixels;
transmit the inverse dithered image to an electronic display or to a memory, wherein the code configured to inverse dither the image data by diffusing an energy from a center pixel of the image area comprises code configured to preserve real edges in the image area and to remove false edges in the image area by, during inverse dithering of the dithered image, limiting the energy diffused to a value inside of a quantization range.

7. The non-transitory computer-readable medium of claim 6, wherein the code configured to analyze the image data comprises code configured to use decompose the image data into RGB color components.

8. The non-transitory computer-readable medium of claim 6, wherein the code configured to inverse dither the image data comprises code configured to spatially inverse dither the image data, temporally inverse dither the image data, or a combination thereof.

9. The non-transitory computer-readable medium of claim 6, wherein the code configured to inverse dither the image data by diffusing an energy from a center pixel of the image area comprises code configured to preserve real edges in the image area and to remove false edges in the image area.

10. The non-transitory computer-readable medium of claim 6, wherein the quantization range comprises between $\{-Q+ \ldots +Q\}$ where N comprises a number of bits lost in quantization of the dithered image, $-Q=-2^N$, and $+Q=2^N-1$.

11. A system comprising:
an image processing device comprising an input port configured to receive a dithered image from an electronic device, and an output port configured to transmit an inverse dithered image to an electronic display, wherein the dithered image is converted into the inverse dithered image by diffusing an energy in the dithered image, and wherein the energy is limited, during inverse dithering of the dithered image, to a value inside of a quantization range.

12. The system of claim 11, wherein the input port comprises a high definition multimedia interface (HDMI) port, a digital visual interface (DVI) port, a DisplayPort, a Mini DisplayPort, a video graphics array (VGA) port, a dock connector port, or a combination thereof.

13. The system of claim 11, wherein the output port comprises an S-video port, an HDMI port, a composite video port, a component video port, a VGA port, a DVI port, a DisplayPort, a Mini DisplayPort, or a combination thereof.

14. The system of claim 11, wherein the image processing device comprises a dongle, a cable, a housing, or a combination thereof.

15. The system of claim 11, wherein the electronic device comprises a laptop computer, a desktop computer, a mobile phone, a digital media player, or a media distribution system.

16. The system of claim 11, wherein the image processing device comprises a processor configured to convert the dithered image into the inverse dithered image by diffusing the energy in the dithered image.

17. The system of claim 16, wherein the processor is configured to diffuse the energy in the dithered image by computing a prediction pixel value P for a pixel based on an average of neighboring pixel values, comparing the prediction pixel value P to a real value of R of the pixel, creating a diffusion value D by computing the difference between P and R, limiting the diffusion value D to the quantization range comprising $\{-Q \ldots +Q\}$ of bits lost in quantization of the dithered image, subtracting the range-limited diffusion value D from P, and adding energy removed from the pixel back to the inverse dithered image.

18. A method for inverse dithering a dithered image comprising:
    selecting a dithered image area surrounding a pixel;
    averaging a first energy in the image area;
    calculating a difference between a second energy of the pixel and the first energy in the image area;
    calculating a limited difference between the second energy of the pixel and the first energy in the image area by restricting the difference between the second energy of the pixel and the first energy in the image area during inverse dithering of the dithered image to a range of values inside of a quantization range;
    updating pixels in the image area by using the limited difference.

19. The method of claim 18, wherein the quantization range comprises between $\{-Q \ldots +Q\}$ where N comprises a number of bits lost in quantization of the dithered image area, $-Q=-2^N$, and $+Q=2^N-1$.

20. The method of claim 18, wherein averaging the first energy in the image area comprises computing an average of a color or grey-scale values in the image area.

21. The method of claim 18, wherein updating pixels in the image area by using the limited difference comprises adding a portion of the limited differences to each pixel in the image area.

22. A system for inverse dithering a dithered image comprising:
    an averager configured to calculate an average of values in a dithered image area;
    subtractor configured to calculate a difference between the average calculated by the average and a value of a pixel in the image area;
    a limiter configured to calculate, during inverse dithering of the dithered image, a range-limited difference based on the difference calculated by the subtractor, wherein the range-limited difference comprises a quantization range; and
    a diffuser configured to diffuse the range-limited difference into the image area.

23. The system of claim 22, wherein the average of values in the image area comprises an average of color values in the image area or grey-scale values in the image area.

24. The system of claim 22, wherein the quantization range comprises between $\{-Q \ldots +Q\}$ where N comprises a number of bits lost in quantization of the dithered image area, $-Q=-2^N$, and $+Q=2^N-1$.

25. The system of claim 22, wherein the diffuser uses an equal energy distribution, a weighted energy distribution, a random weight distribution, or combination thereof to diffuse the range-limited difference into the image area.

* * * * *

UNITED STATES PATENT AND TRADEMARK OFFICE
CERTIFICATE OF CORRECTION

PATENT NO. : 8,760,465 B2  
APPLICATION NO. : 13/085186  
DATED : June 24, 2014  
INVENTOR(S) : Michael Frank and Ulrich T. Barnhoefer Page 1 of 1

It is certified that error appears in the above-identified patent and that said Letters Patent is hereby corrected as shown below:

In the Claims:

In Column 20, claim 10, line 51, please replace the equation "{-Q+ . . . +Q}" with the equation --{-Q . . . +Q}--.

Signed and Sealed this  
Sixteenth Day of September, 2014

Michelle K. Lee  
*Deputy Director of the United States Patent and Trademark Office*